(12) United States Patent
Wang et al.

(10) Patent No.: US 8,984,006 B2
(45) Date of Patent: Mar. 17, 2015

(54) SYSTEMS AND METHODS FOR IDENTIFYING HIERARCHICAL RELATIONSHIPS

(71) Applicant: Google Inc., Mountain View, CA (US)

(72) Inventors: Yu Wang, Beijing (CN); Yixin Chai, Beijing (CN); Fang Chu, Santa Clara, CA (US); Ting Fu, Palo Alto, CA (US); Sean Wonjoon Choi, Seoul (KR); Guangda Lai, Guangzhou (CN); Liu Fang, Beijing (CN); Li Liu, Beijing (CN); Ruohao Li, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/670,819

(22) Filed: Nov. 7, 2012

(65) Prior Publication Data

US 2013/0117253 A1    May 9, 2013

Related U.S. Application Data

(60) Provisional application No. 61/557,136, filed on Nov. 8, 2011.

(51) Int. Cl.
  *G06F 17/30* (2006.01)
(52) U.S. Cl.
  CPC .................. *G06F 17/30893* (2013.01)
  USPC ............. 707/778; 707/625; 707/802
(58) Field of Classification Search
  USPC ......... 707/625, 649, 655, 672, 673, 688, 690, 707/696, 703, 778, 802, 829, 956, 999.008, 707/999.201, 999.1, 999.106
  See application file for complete search history.

(56) References Cited

U.S. PATENT DOCUMENTS

| | | | |
|---|---|---|---|
| 870,611 A | | 11/1907 | Beekley |
| 5,974,407 A | * | 10/1999 | Sacks .................................... 1/1 |

(Continued)

FOREIGN PATENT DOCUMENTS

| | | |
|---|---|---|
| CA | 2313496 A1 | 1/2001 |
| CN | 1955952 A | 5/2007 |

(Continued)

OTHER PUBLICATIONS

"http://google-latlong.blogspot.com/2011/06/introducing-descriptive-terms-in-local.html" Oct. 26, 2011 (p. 1).

(Continued)

*Primary Examiner* — Greta Robinson
(74) *Attorney, Agent, or Firm* — Bracewell & Giuliani LLP

(57) ABSTRACT

Embodiments include a computer-implemented method that includes identifying a candidate parent entity having one or more characteristics indicative of the entity having a parent hierarchical relationship to another entity of an entity set, identifying a candidate child entity set including entities of the entity set that each have one or more characteristics indicative of the entity having a child hierarchical relationship to the candidate parent entity, comparing characteristics of the candidate parent entity to characteristics of an entity of the candidate child entity set to determine whether a hierarchical relationship exists between the candidate parent entity and the entity of the candidate child entity set, determining that a hierarchical relationship exists between the candidate parent entity and the entity of the candidate child entity set, and updating a hierarchical index to reflect the hierarchical relationship between the candidate parent entity and the entity of the candidate child entity set.

20 Claims, 18 Drawing Sheets

(56) References Cited

U.S. PATENT DOCUMENTS

| | | |
|---|---|---|
| 6,542,817 B2 | 4/2003 | Miyaki |
| 6,978,264 B2 | 12/2005 | Chandrasekar et al. |
| 7,003,442 B1 | 2/2006 | Tsuda |
| 7,155,404 B1 | 12/2006 | Johnson et al. |
| 7,177,796 B1 | 2/2007 | Damerau |
| 7,376,636 B1 | 5/2008 | Wang |
| 7,756,864 B2 | 7/2010 | Chandrasekar et al. |
| 7,769,778 B2 | 8/2010 | Snapp |
| 7,809,550 B1 | 10/2010 | Barrows |
| 8,024,329 B1 | 9/2011 | Rennison |
| 8,041,709 B2 | 10/2011 | Permandla et al. |
| 8,423,514 B2 * | 4/2013 | Goldenberg et al. .......... 707/673 |
| 2003/0126235 A1 | 7/2003 | Chandrasekar et al. |
| 2003/0163466 A1 | 8/2003 | Rajaraman et al. |
| 2005/0080770 A1 | 4/2005 | Lueder et al. |
| 2005/0120006 A1 | 6/2005 | Nye |
| 2005/0203918 A1 | 9/2005 | Holbrook |
| 2006/0004797 A1 | 1/2006 | Riise |
| 2006/0074891 A1 * | 4/2006 | Chandrasekar et al. .......... 707/3 |
| 2006/0161535 A1 | 7/2006 | Holbrook |
| 2007/0005593 A1 | 1/2007 | Self |
| 2007/0011146 A1 | 1/2007 | Holbrook |
| 2007/0214179 A1 | 9/2007 | Hoang |
| 2007/0220043 A1 | 9/2007 | Oliver |
| 2007/0226640 A1 | 9/2007 | Holbrook et al. |
| 2008/0010273 A1 | 1/2008 | Frank |
| 2008/0021691 A1 | 1/2008 | Roesner |
| 2008/0140524 A1 | 6/2008 | Anand |
| 2008/0215542 A1 | 9/2008 | Lim |
| 2008/0312992 A1 | 12/2008 | Hoshi |
| 2009/0119333 A1 | 5/2009 | Sundstrom |
| 2009/0132953 A1 | 5/2009 | Reed, Jr. |
| 2009/0228471 A1 | 9/2009 | Dawson et al. |
| 2009/0287737 A1 | 11/2009 | Hammerly |
| 2010/0131335 A1 | 5/2010 | Roh |
| 2010/0161566 A1 | 6/2010 | Adair |
| 2010/0161602 A1 | 6/2010 | Caceres |
| 2010/0169331 A1 | 7/2010 | Karidi |
| 2010/0235334 A1 * | 9/2010 | Porter ........................... 707/694 |
| 2011/0047139 A1 | 2/2011 | Strope |
| 2011/0047146 A1 | 2/2011 | Scott |
| 2011/0047167 A1 | 2/2011 | Caceres |
| 2011/0055173 A1 | 3/2011 | Stoker |
| 2011/0131500 A1 | 6/2011 | Ohazama |
| 2011/0246501 A1 * | 10/2011 | McMenamin et al. ........ 707/769 |
| 2011/0264651 A1 | 10/2011 | Selvaraj |
| 2012/0203766 A1 | 8/2012 | Hörnkvist et al. |

FOREIGN PATENT DOCUMENTS

| | | |
|---|---|---|
| EP | 583108 A2 | 2/1994 |
| EP | 589070 A1 | 3/1994 |
| EP | 1385100 A2 | 1/2004 |
| EP | 1517254 A2 | 3/2005 |
| EP | 1643394 A2 | 4/2006 |
| EP | 1879120 A1 | 1/2008 |
| EP | 2251795 A2 | 11/2010 |
| JP | 9305625 A | 11/1997 |
| JP | 2002366584 A | 12/2002 |
| JP | 2006134154 A | 5/2006 |
| JP | 2009129213 A | 6/2009 |
| JP | 2011145917 A | 7/2011 |
| KR | 2008082513 A | 9/2008 |
| KR | 911762 B1 | 8/2009 |
| KR | 2010059069 A | 6/2010 |
| WO | 0159546 A2 | 8/2001 |
| WO | 2009052245 A2 | 4/2009 |
| WO | 2009061399 A1 | 5/2009 |

OTHER PUBLICATIONS

Copending U.S. Appl. No. 13/670,796 titled "Systems and Methods for Generating and Displaying Hierarchical Search Results", filed Nov. 7, 2012.

"Determining a Level of Importance of an Entity", IP.com Electronic Publication: Jul. 26, 2010, IP.com No. IPCOM000198123D. (pp. 1-39).

Aixin Sun et al., "Hierarchical Text Evaluation and Classification", 2001. (pp. 1-8).

Cattell, KT et al., "Data Model for Hierarchical Views of Entity Oriented Information" O.D.I.: TDB v37 n8 Aug. 1994~ p. 615-618 , IP.com Electronic Publication: Mar. 27, 2005 IP.com No. IPCOM000113494D. (p. 1-5).

Disclosed Anonymously, "System and method to improve the performance of the candidate list generation process of an Entity Analytics system using in-memory, read-only cache", 2011. (pp. 1-20).

International Search Report & Written Opinion for PCT App. No. PCT/US12/63820, mailed Jan. 22, 2013. (pp. 1-12).

Kamal Taha et al., "BusSEngine: a business search engine", 2009. (pp. 1-45).

Katsumi Takahashi et al, "Geo-word centric association rule mining", 2005. (pp. 1-8).

Patricia L. Frontiera, "Flamenco + Geo—extending a hierarchical faceted metadata search interface with geographic capabilities", ACM 2008. (pp. 1-2).

Richi Nayak~, "Mining for Web-Enabled E-Business Applications", 2006. (pp. 1-4).

USPTO Communication for U.S. Appl. No. 13/670,796, mailed Oct. 24, 2014. (pp. 1-15).

* cited by examiner

ENTITY DATABASE TABLE 200

| ID | DESCRIPTOR | CLASS. | GEO. | LOC. | ADDRESS | CHILDREN | PARENTS |
|---|---|---|---|---|---|---|---|
| N1 | Palo Alto Shopping Center | shopping_center | G1 | L1 | 3454 Shopping Avenue, Palo Alto, CA 94302, US | | |
| N2 | The Shopping Center | shopping_center | G2 | L2 | 1 The Shopping Center, Palo Alto, CA 94304, US | | |
| N3 | The Shop | store | G3 | L3 | 234 Main Street, Palo Alto, CA 94304, US | | |
| N4 | Palo Alto Mall | shopping_center | G4 | L4 | 1 Palo Alto Mall, Palo Alto CA 94303, US | | |
| N5 | Clothing Connection | store | G5 | L5 | 1 Palo Alto Mall, Palo Alto, CA 94303, US | | |
| N6 | Dave's Electronics | store | G6 | L6 | 1 The Shopping Center, Palo Alto, CA 94304, US | | |
| N7 | The Suit Store | store | G7 | L7 | 1 The Shopping Center, Palo Alto, CA 94304-1401, US | | |
| N8 | ABC Department Store | store | G8 | L8 | 1 The Shopping Center, Palo Alto, California 94304 U.S. | | |
| N9 | The Shopping Center Food Court | restaurant | G9 | L9 | 1 The Shopping Center, Palo Alto, CA 94304, US | | |
| N10 | The University | university | G10 | L10 | 100 The University Drive, Palo Alto, CA | | |
| N11 | The University College of Engineering | university_department | G11 | L11 | 200 College Drive, Palo Alto, CA 94305, US | | |
| N12 | Admissions Office: The University | university_department | G12 | L12 | 300 Admissions Drive, Palo Alto, CA 94305, US | | |
| N13 | State University | university | G13 | L13 | 100 State University Drive, Palo Alto, CA | | |
| N14 | State University College of Medicine | university_department | G14 | L14 | 200 Medical Dr, Palo Alto, CA | | |
| N15 | The Hospital | hospital | G15 | L15 | 100 Hospital Dr, Palo Alto, CA | | |
| N16 | The Hospital: Mike Smith MD | hospital_department | G16 | L16 | 200 Oak Street, Suite 200, Palo Alto, CA | | |
| N17 | The Hospital: Cardiothoracic Department | hospital_department | G17 | L17 | 200 Oak Street, Suite 330, Palo Alto, CA | | |
| N18 | Palo Alto Hospital | hospital | G18 | L18 | 111 Main Street, Palo Alto, CA 94304, US | | |
| N19 | Shopping Avenue | street | G19 | L19 | | | |
| N20 | The Shopping Center | street | G20 | L20 | | | |
| N21 | Main Street | street | G21 | L21 | | | |
| N22 | Palo Alto Mall | street | G22 | L22 | | | |
| N23 | The University Drive | street | G23 | L23 | | | |
| N24 | College Drive | street | G24 | L24 | | | |
| N25 | Admissions Drive | street | G25 | L25 | | | |
| N26 | State University Drive | street | G26 | L26 | | | |
| N27 | Medical Drive | street | G27 | L27 | | | |
| N28 | Hospital Dr | street | G28 | L28 | | | |
| N29 | Oak Street | street | G29 | L29 | | | |
| ... | | | | | | | |

GROUPING OF ENTITIES HAVING NORMALIZED ADDRESS OF "1-the_shopping_center-palo_alto-CA-94304-US"

| ID | DESCRIPTOR | CLASS. | GEO. | LOC. | ADDRESS | CHILDREN | PARENTS |
|---|---|---|---|---|---|---|---|
| N2 | The Shopping Center | shopping_center | G2 | L2 | 1-the_shopping_center-palo_alto-CA-94304-US | | |
| N6 | Dave's Electronics | store | G6 | L6 | 1-the_shopping_center-palo_alto-CA-94304-US | | |
| N7 | The Suit Store | store | G7 | L7 | 1-the_shopping_center-palo_alto-CA-94304-US | | |
| N8 | ABC Department Store | store | G8 | L8 | 1-the_shopping_center-palo_alto-CA-94304-US | | |
| N9 | The Shopping Center Food Court | restaurant | G9 | L9 | 1-the_shopping_center-palo_alto-CA-94304-US | | |

| HIEARCHICAL INDEX | | | |
|---|---|---|---|
| ID | DESCRIPTOR | CHILDREN | PARENTS |
| N2 | The Shopping Center | N6,N7,N8,N9 | |
| N6 | Dave's Electronics | | N2 |
| N7 | The Suit Store | | N2 |
| N8 | ABC Department Store | | N2 |
| N9 | The Shopping Center Food Court | | N2 |
| ... | ... | ... | ... |

FIG. 10

ENTITY DATABASE TABLE 200'

| ID | DESCRIPTOR | CLASS. | GEO. | LOC. | ADDRESS | CHILDREN | PARENTS |
|---|---|---|---|---|---|---|---|
| N1 | Palo Alto Shopping Center | shopping_center | G1 | L1 | 3454 Shopping Avenue, Palo Alto, CA 94302, US | | |
| N2 | The Shopping Center | shopping_center | G2 | L2 | 1 The Shopping Center, Palo Alto, CA 94304, US | N6, N7, N8, N9 | |
| N3 | The Shop | store | G3 | L3 | 234 Main Street, Palo Alto, CA 94304, US | | |
| N4 | Palo Alto Mall | shopping_center | G4 | L4 | 1 Palo Alto Mall, Palo Alto CA 94303, US | N5 | |
| N5 | Clothing Connection | store | G5 | L5 | 1 Palo Alto Mall, Palo Alto CA 94303, US | | N4 |
| N6 | Dave's Electronics | store | G6 | L6 | 1 The Shopping Center, Palo Alto, CA 94304, US | | N2 |
| N7 | The Suit Store | store | G7 | L7 | 1 The Shopping Center, Palo Alto, CA 94304-1401, US | | N2 |
| N8 | ABC Department Store | store | G8 | L8 | 1 The Shopping Center, Palo Alto, California 94304 U.S. | | N2 |
| N9 | The Shopping Center Food Court | restaurant | G9 | L9 | 1 The Shopping Center, Palo Alto, CA 94304, US | | N2 |
| N10 | The University | university | G10 | L10 | 100 The University Drive, Palo Alto, CA 94305, US | N11, N12 | |
| N11 | The University College of Engineering | university_department | G11 | L11 | 200 College Drive, Palo Alto, CA 94305, US | | N10 |
| N12 | Admissions Office: The University | university_department | G12 | L12 | 300 Admissions Drive, Palo Alto, CA 94305, US | | N10 |
| N13 | State University | university | G13 | L13 | 100 State University Drive, Palo Alto, CA | N14 | |
| N14 | State University College of Medicine | university_department | G14 | L14 | 200 Medical Dr, Palo Alto, CA | | N13 |
| N15 | The Hospital | hospital | G15 | L15 | 100 Hospital Dr, Palo Alto, CA | N16, N17 | |
| N16 | The Hospital: Mike Smith MD | hospital_department | G16 | L16 | 200 Oak Street, Suite 200, Palo Alto, CA | | N15 |
| N17 | The Hospital: Cardiothoracic Department | hospital_department | G17 | L17 | 200 Oak Street, Suite 300, Palo Alto, CA | | N15 |
| N18 | Palo Alto Hospital | hospital | G18 | L18 | 111 Main Street, Palo Alto, CA 94304, US | | |
| N19 | Shopping Avenue | street | G19 | L19 | | | |
| N20 | The Shopping Center | street | G20 | L20 | | | |
| N21 | Main Street | street | G21 | L21 | | | |
| N22 | Palo Alto Mall | street | G22 | L22 | | | |
| N23 | The University Drive | street | G23 | L23 | | | |
| N24 | College Drive | street | G24 | L24 | | | |
| N25 | Admissions Drive | street | G25 | L25 | | | |
| N26 | State University Drive | street | G26 | L26 | | | |
| N27 | Medical Drive | street | G27 | L27 | | | |
| N28 | Hospital Dr | street | G28 | L28 | | | |
| N29 | Oak Street | street | G29 | L29 | | | |
| ... | ... | ... | ... | ... | ... | ... | ... |

FIG. 14 — Table 1400

| Rank | ID | Descriptor |
|---|---|---|
| 1 | N1 | Palo Alto Shopping Center |
| 2 | N2 | The Shopping Center |
| 3 | N15 | Clothing Connection |
| 4 | N130 | Where to shop in Palo Alto |
| 5 | N36 | Palo Alto Hotel |
| ⋮ | ⋮ | ⋮ |

FIG. 15 — Table 1500

| Rank | ID | Descriptor |
|---|---|---|
| 1 | N7 | The Suit Store |
| 2 | N8 | ABC Department Store |
| 3 | N6 | Dave's Electronics |
| 4 | N9 | The Shopping Center Food Court |
| ⋮ | ⋮ | ⋮ |

FIG. 16 — Table 1600

| Rank | ID | Descriptor | |
|---|---|---|---|
| 1 | N1 | Palo Alto Shopping Center | ← 1604a |
| 2 | N2 | The Shopping Center | ← 1604b |
| 2.1 | N7 | The Suit Store | ← 1604c |
| 2.2 | N8 | ABC Department Store | ← 1604d |
| 2.3 | N6 | Dave's Electronics | ← 1604e |
| 3 | N5 | Clothing Connection | ← 1604f |
| 3.1 | N4 | Palo Alto Mall | ← 1604g |
| 4 | N130 | Palo Alto Hotel | ← 1604h |
| ⋮ | ⋮ | ⋮ | |

Rows 2–2.3 grouped as 1602a; rows 3–3.1 grouped as 1602b (collectively 1602).

FIG. 20A

SYSTEMS AND METHODS FOR IDENTIFYING HIERARCHICAL RELATIONSHIPS

PRIORITY

This application claims the benefit of U.S. Provisional Patent Application No. 61/557,136 filed on Nov. 8, 2011 and titled "SYSTEMS AND METHODS FOR GENERATING AND DISPLAYING HIERARCHICAL SEARCH RESULTS", the disclosure of which is hereby incorporated by reference in its entirety.

BACKGROUND OF THE INVENTION

1. Field of the Invention

Embodiments of this invention relate generally to search industries and, more particularly to special purpose machines, systems, methods and computer instructions for providing listings of results indicative of a hierarchical relationship.

2. Description of the Related Art

Users employ Internet searches to locate and identify information on the Internet. For example, a user may visit an Internet search-website and submit a web-search query for the keyword "shopping" in anticipation of receiving a listing of webpages or other resources related to "shopping". These types of searches help users quickly and easily find information on the Internet.

When a user submits a web-search query, a search engine identifies search results that relate to the search query and provides the search results for display to the user. For example, upon the user submitting a web-search query for the term "shopping", the search engine may reference an index to identify web pages that include content related to "shopping", and provide a listing of the identified web pages for display to the user. Similar listing of results may be provided in other context, such as map-based searches, user check-in locations and the like. Unfortunately, traditional listings of results provide a limited amount of information about the displayed search results. For example, a set of search results may include a simple ranked listing that provides no indication of relationships between the search results.

SUMMARY OF THE INVENTION

Various embodiments of methods and apparatus for identifying hierarchical relationships between entities are provided herein. In some embodiments, provided is a computer-implemented method that includes identifying a candidate parent entity having one or more characteristics indicative of the entity having a parent hierarchical relationship to another entity of an entity set, identifying a candidate child entity set including entities of the entity set that each have one or more characteristics indicative of the entity having a child hierarchical relationship to the candidate parent entity, comparing characteristics of the candidate parent entity to characteristics of an entity of the candidate child entity set to determine whether a hierarchical relationship exists between the candidate parent entity and the entity of the candidate child entity set, determining that a hierarchical relationship exists between the candidate parent entity and the entity of the candidate child entity set, and updating a hierarchical index to reflect the hierarchical relationship between the candidate parent entity and the entity of the candidate child entity set.

In some embodiments, provided is a non-transitory computer readable storage medium having computer-executable program instructions stored thereon that are executable by a computer to cause identifying a candidate parent entity having one or more characteristics indicative of the entity having a parent hierarchical relationship to another entity of an entity set, identifying a candidate child entity set including entities of the entity set that each have one or more characteristics indicative of the entity having a child hierarchical relationship to the candidate parent entity, comparing characteristics of the candidate parent entity to characteristics of an entity of the candidate child entity set to determine whether a hierarchical relationship exists between the candidate parent entity and the entity of the candidate child entity set, determining that a hierarchical relationship exists between the candidate parent entity and the entity of the candidate child entity set, and updating a hierarchical index to reflect the hierarchical relationship between the candidate parent entity and the entity of the candidate child entity set.

In some embodiments, provided is a system including one or more memories storing instructions and one or more processors coupled to the one or more memories and executing the instructions stored thereon in order to perform the following steps: identifying a candidate parent entity having one or more characteristics indicative of the entity having a parent hierarchical relationship to another entity of an entity set, identifying a candidate child entity set including entities of the entity set that each have one or more characteristics indicative of the entity having a child hierarchical relationship to the candidate parent entity, comparing characteristics of the candidate parent entity to characteristics of an entity of the candidate child entity set to determine whether a hierarchical relationship exists between the candidate parent entity and the entity of the candidate child entity set, determining that a hierarchical relationship exists between the candidate parent entity and the entity of the candidate child entity set, and updating a hierarchical index to reflect the hierarchical relationship between the candidate parent entity and the entity of the candidate child entity set.

BRIEF DESCRIPTION OF THE DRAWINGS

FIG. 2 illustrates a database table in accordance with one or more embodiments of the present technique.

FIG. 9 is a table that illustrates an exemplary grouping in accordance with one or more embodiments of the present technique.

FIG. 10 illustrates an exemplary updated database table including an indication of identified hierarchical relationships in accordance with one or more embodiments of the present technique.

FIG. 11 illustrates an exemplary hierarchical index including an indication of identified hierarchical relationships in accordance with one or more embodiments of the present technique.

FIG. 14 is a table that illustrates an exemplary set of search results in accordance with one or more embodiments of the present technique.

FIG. 15 is a table that illustrates an exemplary set of child search results in accordance with one or more embodiments of the present technique.

FIG. 16 is a table that illustrates an exemplary set of hierarchical search results in accordance with one or more embodiments of the present technique.

FIGS. 20A and 20B illustrate exemplary place pages in accordance with one or more embodiments of the present technique.

DETAILED DESCRIPTION

Figure 1:
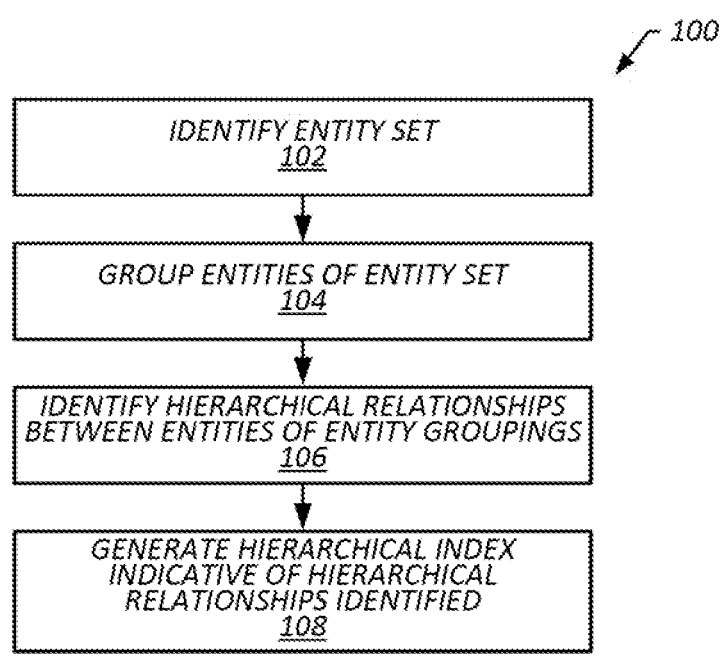
FIG. 1 is a flowchart that illustrates a method of generating a hierarchical index in accordance with one or more embodiments of the present technique.

As discussed in more detail below, provided are embodiments of systems and methods for identifying hierarchical relationships and displaying listings of results corresponding to the hierarchical relationships identified.

In some embodiments, identifying hierarchical relationships includes identifying parent-child hierarchical relationships between various entities. For example, in the context of a shopping center and stores located within the shopping center, the shopping center and stores may be identified as having a parent-child hierarchical relationship, with the shopping center being identified as a "parent" of the stores located within the shopping center. In certain embodiments, the hierarchical relationships are determined by mining a database of entities and information associated therewith. For example, a database that includes entries relating to "The Shopping Center" and the stores located within "The Shopping Center" may be analyzed ("mined") to identify the parent-child hierarchical relationships between "The Shopping Center" and the stores located within "The Shopping Center". As is discussed in more detail below, in some embodiments, hierarchical relationships between entities are established based on various characteristics and features of the entities. For example, hierarchical relationships may be based on the entities' addresses, descriptors (e.g., titles/names), locations, geometries, user interactions with web pages corresponding to the entities, or the like.

In some embodiments, additional techniques are employed to assist in identifying hierarchical relationships between entities. For example, entities that are considered to be more likely to have hierarchical relationships may be grouped together, and the entities within each grouping may be compared to one another to identify hierarchical relationships between members of the grouping. For example, entities having a classification of "shopping mall" may be grouped with other entities have a classification of "store" based on a determination that entities of the classifications "shopping mall" and "store" are likely to have hierarchical relationships with one another. The grouped entities, such as those having classifications of "shopping mall" and "store" may, then, be compared to one another to identify hierarchical relationships there between. As discussed in more detail below, groupings of entities may be based on entity types/classifications, addresses, descriptors, locations, geometries, or the like. It is expected that such groupings may increase the efficiency with which hierarchical relationships are identified by at least reducing comparisons of unrelated entities. For example, groupings may eliminate the comparison of a shopping mall in California with a river in the state of New York. Accordingly, hierarchical relationships may be mined more efficiently by eliminating, or at least reducing, burdensome processing that may take place if every entity of a database were compared to every other entity of the database.

In some embodiments, a process of identifying hierarchical relationships between entities includes identifying a set of entities for comparison, grouping related entities, identifying ("mining") hierarchical relationships between the entities of the groupings, and generating an index indicative of the hierarchical relationships identified. For example, a database of entities may be identified, the entities may be placed into groupings based on common attributes (e.g., entity types/ classifications, addresses, descriptors, locations, geometries, or the like), entities within the groups may be compared to determine whether or not hierarchical relationships exists, and the database and/or a separate hierarchical index may be generated/updated to reflect the hierarchical relationships identified.

Hierarchical relationships, such as those identified using techniques described herein, may be employed for various uses including, for example, determining how listings of results are displayed to users. For example, where a set of search results includes a result for "The Shopping Center" (a parent result), the search results displayed to the user may include child search results corresponding to "Dave's Electronics", "The Suit Store", and other stores located within "The Shopping Center" that are displayed in an indented listing immediately below the search result for "The Shopping Center". As a further example, where a list of results includes parent and/or child results, the list of results may be reordered such that the displayed listing of results includes the parent results listed ahead of (i.e., above) the child results. As yet another example, the hierarchical relationships may be employed for identifying child/parent content to be displayed within a webpage. For example, a place page for "The Shopping Center" may include a listing of "Dave's Electronics", "The Suit Store", and other stores located within "The Shopping Center".

A parent entity may include an entity (e.g., a shopping center) having one or more other subordinate entities (e.g., stores) that are physically or logically a part of the entity. A child entity may include a subordinate entity (e.g., store) that is physically or logically a part of the parent entity (e.g., a shopping center). A given entity may be subordinate to some entities while being superior to other entities (i.e., an entity may be both of a child and a parent entity). In a child-parent hierarchy, the parent (e.g., the shopping center) may be referred to as residing at first/higher-hierarchy level, and the children (e.g., the stores located in the shopping center) may be referred to as residing at a second/lower-hierarchy level that is immediately below the hierarchical level of the parent. Similar hierarchical relationships may be provided in other contexts, such as a university (e.g., the parent) and departments within the university (e.g., the children), a department store (e.g., the parent) and departments within the department store (e.g., the children) and so forth. Hierarchical relationships can span multiple levels. For example, a grand-parent/grand-child hierarchical relationship or the like may exist between entities.

FIG. 1 is a flowchart that illustrates an exemplary method 100 of generating a hierarchical index. Method 100 may generally include identifying an entity set, grouping entities of the entity set, identifying hierarchical relationships between entities of the of the groupings, and generating a hierarchical index indicative of the hierarchical relationships identified.

Method 100 may include identifying an entity set as depicted at block 102. In some embodiments, identifying an entity set includes identifying a collection of entities and/or data corresponding thereto. For example, identifying an entity set may include identifying a plurality of datasets of an entity database table.

FIG. 2 illustrates an exemplary entity database table ("table") 200. Table 200 includes a plurality of entries 202 that each correspond to a given entity (e.g., "Palo Alto Shopping Center", "The Shopping Center", "The Shop", and so forth). An entity may include a thing having a distinct existence. For example, an entity may include an electronic document (e.g., a webpage or file), a person, a geographic object (e.g., a street, a residence, a place of business, a landmark, a park, a political entity (e.g., a city, a county, a state, a country), a geographic feature (e.g., lake, river, mountain), or the like. Table 200 may represent a search engine database table/index that is searchable to identify entries/entities that are related to a query. In some embodiments, table 200 may include hierarchical information for entities such that the database table is, or is otherwise capable of serving as, a hierarchical index that can be analyzed to identify hierarchical relationships (e.g., parent-child relationships) between entities. Table 200 may be created or maintained by a search provider or other entity. Table 200 may include entries having information extracted from or otherwise derived from a search engine database. For example, table 200 may include an indexed listing of entities generated based on crawling of Internet websites. In some embodiments, each of the entries may correspond to a given entity and may include information corresponding to the given entity. In some embodiments, table 200 may be modified over time to reflect new information that is received or otherwise identified. For example, entries 202 may be created as new entities are identified and/or existing entries 202 may be modified as new information relating to the entities is received.

Each entry 202 may include an identifier 204, a descriptor 206, a classification 208, geometry 210, a location 212, an address 214, associated children 216, associated parents 218 and/or other information related to the entity, such as a URL Address for a webpage for the entity. Identifier 204 may include a unique identifier that is used to distinguish a given entry 202 from other entries of table 200. Descriptor 206 may specify a name/title or other descriptive information associated with the corresponding entity. Classification 208 may specify or otherwise be indicative of a type/classification associated with the corresponding entity.

Entities may be assigned one or more classifications. For example, entities that corresponds to shopping malls (e.g., "The Shopping Center", "Palo Alto Mall", etc.) may be assigned classifications of "shopping_center", entities that corresponds to stores (e.g., "Dave's Electronics", "The Suit Store", "The Clothing Connection", etc.) may be assigned classifications of "store", entities that corresponds universities (e.g., "The University", "State University", etc.) may be assigned a classification of "university", entities that corresponds to a department within a university (e.g., "The University College of Engineering" and "State University College of Medicine") may be assigned a classification of "university_department", and so forth.

Geometry 210 may specify or otherwise be indicative of a geometry associated with the corresponding entity. Geometry 210 may represent a set of one or more points and/or lines defining a geometry corresponding to the entity. For example, the geometry "G1" may define a polygon corresponding to a geographic perimeter/boundary of the "Palo Alto Shopping Center".

Location 212 may specify or otherwise be indicative of a geographic location associated with the corresponding entity. Location 212 may represent a set of geographic coordinates (e.g., longitude and latitude coordinates) or other information defining one or more geographic locations corresponding to the entity. For example, the location "L1" may define geographic coordinates corresponding to a location of the "Palo Alto Shopping Center".

Address 214 may specify or otherwise be indicative of a physical/geographic address associated with the corresponding entity. For a given entry 202, children 216 may include a listing of one or more identifiers corresponding to entities that are children of the entity corresponding to the given entry. For a given entry 202, parents 218 may include a listing of one or more identifiers 204 corresponding to entities that are parents of the entity corresponding to the given entry. Exemplary populated listings of children 216 and parents 218 are depicted and discussed in more detail with regard to at least FIGS. 10 and 11.

Grouping:

Method 100 may include grouping entities of the entity set, as depicted at block 104. In some embodiments, grouping entities of the entity set includes identifying entities of the entity set that are considered to be more likely to have hierarchical relationships there between, and grouping those entities together. In some embodiments, groupings of entities are based on various features of the entities, such as classifications, addresses, descriptors, locations, geometries, or the like.

Grouping Based on Classification:

In some embodiments, entities are grouped together based on a predefined parent-child hierarchical relationship between classifications. A classification hierarchical relationship may identify two or more classifications of entities that should be grouped together. For example, a classification hierarchical relationship may specify "shopping_center-store" indicating that entities having a classification of "shopping_center" should be grouped with entities having a classification of "store". In some embodiments, a classification hierarchical relationship may be defined based on classifications of entities that are likely to have a hierarchical relationship there between. For example, classification hierarchical relationship may include "shopping_center-store" based on stores being likely children of shopping centers. Other examples of classification hierarchical relationships may include "university-university_department", "hospital-hospital department", "city-street" and so forth. In some embodiments, a classification hierarchical relationship may be indicative of a relationship between the specified categories. For example, the "shopping_center-store" classification hierarchical relationship may indicative of the "shopping center" being a parent classification and "store" being a child classification. Such a relationship may be referred to as a parent-child classification hierarchical relationship.

Figure 3:
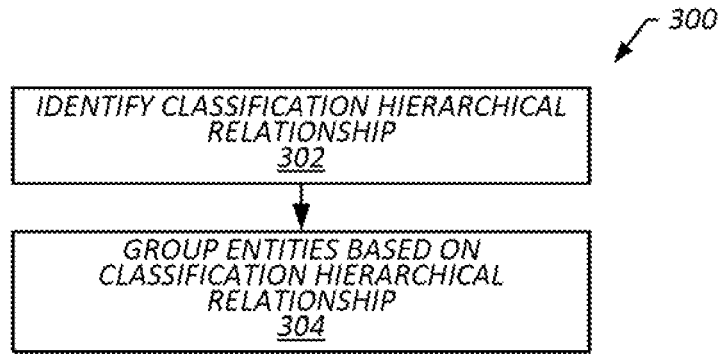
FIG. 3 is a flowchart that illustrates a method of grouping entities based on classifications in accordance with one or more embodiments of the preset technique.

FIG. 3 is a flowchart that illustrates an exemplary method 300 of grouping entities based on classifications. Method 300 may include identifying a classification hierarchical relationship, as depicted at block 302. In some embodiments, identifying a classification hierarchical relationship includes identifying a predefined parent-child hierarchical relationship, such as "shopping_center-store", "university-university_department", "hospital-hospital_department", "city-street" or the like.

Method 300 may include grouping entities based on the classification hierarchical relationship, as depicted at block 304. In some embodiments, entities that fall in either of the parent classification or the child classification of the parent-child hierarchical relationship may be added to the same grouping. For example, with regard to the "shopping_center-store" parent-child hierarchical relationship and table 200 of FIG. 2, "Palo Alto Shopping Center", "The Shopping Center" and "Palo Alto Mall" may be added to a grouping based on their classifications of "shopping_center" and "The Shop", "Clothing Connection", "Dave's Electronics", "The Suit Store" and "ABC Department Store" may be added to the grouping based on their classifications of "store". Similar groupings may be generated based on the other hierarchical relationships (e.g., "university-university_department", "hospital-hospital_department", "city-street" or the like).

Grouping Based on Keywords of Entity Descriptors:

In some embodiments, entities are associated with a classification based on keywords or phrases in their descriptors. For example, where the classification of "shopping_center" is associated with the keywords "shopping_center", "mall", "shopping mall", and the like, the entities titled "Palo Alto Shopping Center", "The Shopping Center", "Palo Alto Mall", "The Shopping Center Food Court" and "The Shopping Center Drive" may be associated with the classification of "shopping_center" based on each of their descriptors including the keywords "shopping center", "mall", and/or "shopping mall". As a further example, where the classification of "store" is associated with the keywords "store", "shop" and the like, the entities entitled "The Shop" and "The Suit Store" may be associated with the classification of "store" based on each of their descriptors including the keywords "store" and/or "shop". In some embodiments, matches between descriptors (e.g., titles/names) and keywords may be based on comparisons of a normalized version of the descriptor with a normalized version of one or more keywords. For example, the descriptor of "Palo Alto Shopping Center" may be determined to include the keyword "shopping_center" based on the normalized descriptor of "palo_alto_shopping_center" including the normalized keyword of "shopping_center".

In some embodiments, the entities that are associated with a classification are grouped with entities associated with other classifications based on a classification hierarchical relationship. For example, with regard to the "shopping center-store" classification hierarchical relationship, a grouping may include "Palo Alto Shopping Center", "The Shopping Center", "Palo Alto Mall", "The Shopping Center Food Court", "The Shopping Center Drive", "The Shop" and/or "The Suit Store" based on each of their descriptors including keywords associated with the classifications of "shopping_center" or "store". Similar groupings may be generated based on the other classification hierarchical relationships such as "university-university_department", "hospital-hospital_department", "city-street" and so forth.

Figure 4:
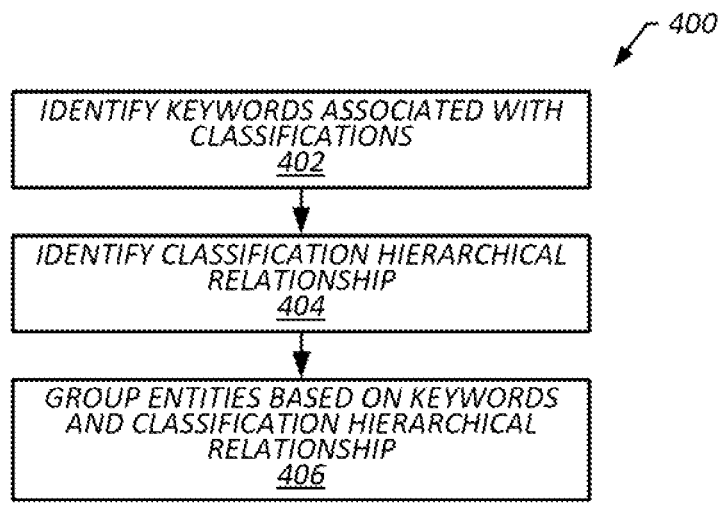
FIG. 4 is a flowchart that illustrates a method of grouping entities based on keywords or phrases in the descriptor of the entities in accordance with one or more embodiments of the preset technique.

FIG. 4 is a flowchart that illustrates an exemplary method 400 of grouping entities based on keywords in entity descriptors. Method 400 may include identifying keywords associated with classifications, as depicted at block 402. In some embodiments, identifying keywords associated with classifications includes retrieving or otherwise obtaining a list of one or more terms and/or phrases associated with given classifications. For example, identifying keywords associated with the classification of "shopping_center" may include retrieving a listing of the keywords "shopping center", "mall", "shopping mall", and the like.

Method 400 may include identifying a classification hierarchical relationship, as depicted at block 404. In some embodiments, identifying a classification hierarchical relationship is similar to that described above with regard to at least block 302 of method 300. Method 400 may include grouping entities based on the identified keywords and the classification hierarchical relationship, as depicted at block 406. For example, with regard to the "shopping_center-store" classification hierarchical relationship the "Palo Alto Shopping Center", "The Shopping Center", "Palo Alto Mall", "The Shopping Center Food Court", "The Shopping Center Drive", "The Shop" and "The Suit Store" may be grouped together based on each of their descriptors including keywords associated with the classifications of "shopping_center" and/or "store", as discussed above.

A set of keywords associated with a classification may be identified based on an initial set of keywords ("seed keywords") that are associated with the classification. In some embodiments, a set of seed keywords is associated with a classification, a set of entity descriptors that contain one or more of the seed keywords are identified, and the words contained in the entity descriptors are assessed to identify other keywords that should be associated with the classification, and the other keywords are added to the set of keywords associated with the classification. Thus, for example, a small set of seed keywords associated with the classification can be used to identify an expanded set of keywords that may not have an apparent association with the classification.

In an exemplary embodiment, the keywords "hospital" and "medical center" are identified as seed keywords for the classification of "hospital". The seed keywords may be identified based on their well-known association with hospitals and similar medical entities. A database of entities may then be assessed to identify a subset of the entities having entity descriptors that include the seed keywords "hospital" or "medical center" in their descriptor. The subset of entities may be referred to as a seed entity set. In some embodiments, the process of identifying entities with descriptors that include the seed keywords is aided by comparing normalized versions of the seed keywords and the entity descriptors. For example, the seed-keyword "hospital" may be normalized to "-hospit-" and the entity descriptor "Shriners Hospitals-Children" may be normalized to "-shriner-hospit-children-". The entity descriptor "Shriners Hospitals-Children" may be considered to include the seed keyword "hospital" based on the text of the normalized descriptor of "-shriner-hospit-children-" including the normalized text of "-hospit-". In some embodiments, a seed entity set is generated for each of the seed keywords. For example, a first seed entity set may be generated that includes entities having the term "hospital" in their descriptor and a first seed entity set may be generated that includes entities having the term "medical center" in their descriptor. Each of the seed entity sets may be assessed to identify other keywords that occur in the descriptors of the entities of the seed entity sets. In some embodiments, the descriptors of the entities of a given seed entity set may be processed to generate a seed keyword list that includes all of the words/phrases contained in the descriptors of the entities of the given seed-entity-set.

In some embodiments, the seed-keyword-list includes N-grams (e.g., uni-grams, bi-grams and tri-grams) indicative of all combinations of one, two or three consecutive words in the descriptors. For example, the entity descriptor "Shriners Hospitals-Children" may be broken into the uni-grams "Shriners", "Hospitals" and "Children", the bi-grams "Shriners Hospitals" and "Hospitals Children", and the tri-gram "Shriners Hospitals Children". The seed keyword list for a given seed entity set may include some or all of the N-grams contained in all of the descriptors of the entities of the seed entity set. In some embodiments, certain words/phrases are filtered/removed from the seed-keyword-list. For example, common words and/or phrases, such as "a", "and", "the", and so forth, may be excluded/removed from the seed keywords list using a stop-word list or tf-idf filtering technique.

In some embodiments, the words/phrases/n-grams of a seed-keyword-list may be ranked based on the number of times they appear in the seed-keyword-list. For example, a word/phrase/n-gram that occurs ten times in the seed-keyword-list may be ranked above a word/phrase/n-gram that occurs nine times in the seed-keyword-list, and so forth. In some embodiments, a count for an N-gram may be associated with a normalized version of the given N-gram having the highest number of occurrences. For example where the normalized text "medical center" occurs one hundred fifty times and the text "medical centers" occurs sixty times in a seed keyword set, such that the stemmed N-gram "-medic-center-" occurs a total of two hundred ten times in the seed keyword set, a count of two hundred ten may be associated with "medical center" as it is the normalized text having the highest number of occurrences. In some embodiments, a filtered/ranked seed keyword list is subjected to manual review. Such review may enable a person to manually review and remove words/phrases from the seed-keyword-list.

In some embodiments, a ranked/filtered seed keyword list is generated for each of the seed keywords. For example, a ranked/filtered seed keyword list may be generated for each of "hospital", "medical center", "hotel", "motel" and so forth. In some embodiments, seed keyword lists corresponding to seed keywords that are associated with a given classification are merged into a single expanded seed keyword list that is associated with the given classification. For example, where the classification of "hospital" is associated with the seed keywords "hospital" and "medical center", the ranked/filtered seed keyword list for the seed keyword "hospital" may be merged/combined with the ranked/filtered seed keyword list for the seed keyword "medical center" to generate a single expanded seed keyword list for the classification of "hospital". As a further example, where the classification of hospital "hotel" is associated with the seed keywords "hotel" and "motel", the ranked/filtered seed keyword list for the seed keyword "hotel" may be merged with the ranked/filtered seed keyword list for the seed keyword "motel" to generate a single expanded seed keyword list for the classification of "hotel". Accordingly, a comprehensive listing of words/phrases associated with a given classification can be generated based on a relatively small number of seed keywords initially identified as being associated with the classification.

Grouping Based on Address:

In some embodiments, grouping entities includes grouping entities based on addresses. For example, entities having the same or similar address may be grouped together. In some embodiments, the addresses used for comparisons may include normalized addresses. For example, "The Shopping Center", "Dave's Electronics", "The Suit Store", "ABC Department Store" and "The Shopping Center Food Court" may be grouped together based on each of the entities having an address in table 200 that corresponds to the normalized address of "1-the_shopping_center-palo_alto-ca-94034-us".

Figure 5:
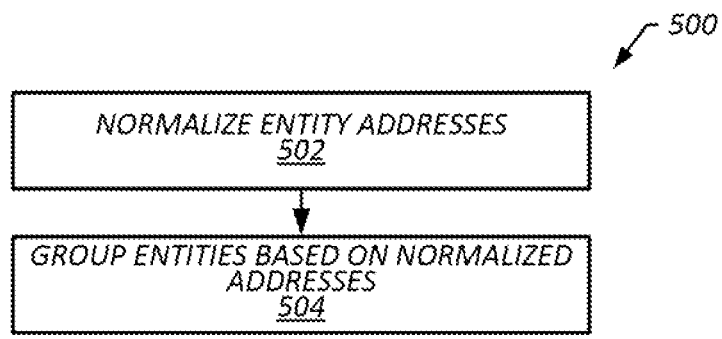
FIG. 5 is a flowchart that illustrates a method of grouping entities based on addresses in accordance with one or more embodiments of the present technique.

FIG. 5 is a flowchart that illustrates an exemplary method 500 of grouping entities based on addresses. Method 500 may include normalizing entity addresses, as depicted at block 502. In some embodiments, normalizing entity addresses includes normalizing the address of some or all of the entities of the entity set identified at block 102. For example, normalizing address may include normalizing addresses 208 of some or all of the entities of table 200. Normalizing addresses may include converting the addresses to a standard format that includes street number, street name, city, state, zip-code, country code or the like, all lowercase letters, an underscore in place of spaces, and a dash separating different fields of the address and so forth. For example, the address of "1 The Shopping Center Palo Alto, Calif. 94034, US" may be normalized to "1-the_shopping_center-palo_alto-ca-94034-us", the address "234 Main Street, Palo Alto, Calif., 94034, US" may be normalized to "234-main_street-palo_alto-ca-94034-us", and so forth.

Method 500 may include grouping entities based on normalized addresses, as depicted at block 504. Grouping entities based on normalized addresses may include adding entities with the same or similar normalized addresses to the same group. For example, "The Shopping Center", "Dave's Electronics", "The Suit Store", "ABC Department Store" and "The Shopping Center Food Court" may be grouped together based on each of the entities have the same normalized address of "1-the_shopping_center-palo_alto-ca-94034-us".

Grouping Based on Candidate Parent Entity:

In some embodiments, grouping entities includes identifying candidate parent entities and grouping candidate child entities with one or more corresponding parent entities. Such a technique may result in groups of entities that each includes one or more candidate parent entities and one or more candidate child entities. A given entity may be identified as a candidate parent entity based on one or more characteristics of the entity (e.g., a classification, geometry, descriptor, or the like) and may be grouped with other entities having characteristics indicative of them being children of the candidate parent entity (e.g., a descriptor that includes the descriptor of the candidate parent entity, a location proximate to the location of the candidate parent entity, a location contained by a geometry of the candidate parent entity, or the like).

Identifying Candidate Parent Entities:

In some embodiments, candidate parent entities are identified based on characteristics of the entity, such as a classification that is associated with a parent entity (e.g., shopping center, university, hospital, or the like), a geometry that is that is associated with a parent entity (e.g., a geometry that includes a polygon/area), and/or a descriptor including keywords associated with a parent entity (e.g., "shopping center", "mall", "shopping mall", and the like).

For example, each of "Palo Alto Shopping Center", "The Shopping Center" and "Palo Alto Mall" may be identified as candidate parent entities based on their classification of "shopping_center", each of "The University" and "State University" may be identified as candidate parent entities based on their classification of "university", and each of "The Hospital" and "Palo Alto Hospital" may be identified as candidate parent entities based on their classification of "hospital". In some embodiments, entities having categories that correspond to a child entity (e.g., "store", "university_department" and so forth) are not identified as a candidate parent entity.

As a further example, where geometries "G1", "G2", "G4", "G10", "G13", "G15" and "G18" are indicative of geometries including a polygon (e.g., representative of a geographic area), each of "Palo Alto Shopping Center", "The Shopping Center", "Palo Alto Mall", "The University", "State University". "The Hospital" and "Palo Alto Hospital", may be identified as candidate parent entities based on their geometries including a polygon. In some embodiments, entities having geometries that correspond to a child entity (e.g., a geographic point, a line, or the like) are not identified as a candidate parent entity.

As a further example, where the keywords/phrases of "shopping center", "mall", "shopping mall" are identified as being associated with a parent entity, each of "Palo Alto Shopping Center", "The Shopping Center" and "Palo Alto Mall" may be identified as candidate parent entities based on their descriptors including the keywords "shopping center", "mall", or "shopping mall".

In some embodiments, one or more entities ("candidate child entities") are grouped with candidate parent entities based on each of the entities having characteristics indicative of a parent-child relationship between the entity and the candidate parent entity. Thus, each resulting grouping may include a candidate parent entity and one or more candidate child entities. In some embodiments, the candidate parent entity for a given grouping may be compared to each of the candidate child entities within the grouping to determine whether a hierarchical relationship exists between the candidate parent entity and any of the candidate child entities as discussed in more detail below with regard to at least method 800 of FIG. 8.

Grouping Based on Descriptor:

In some embodiments, an entity is grouped with a candidate parent entity if the entity has a descriptor that includes the descriptor of the candidate parent entity. For example, where "The Shopping Center" is identified as a candidate parent entity, "The Shopping Center Food Court" may be grouped with "The Shopping Center" as a candidate child entity based on the descriptor "The Shopping Center Food Court" including the substring of "The Shopping Center". As a further example, candidate child entities titled "The University College of Engineering" and "Admissions Office: The University" may be grouped with candidate parent entity "The University" based on their descriptors including the substring of "The University". In some embodiments, the descriptors used for comparisons include normalized descriptors. For example, "The Shopping Center Food Court" may be grouped with "The Shopping Center" based on its normalized descriptor "the_shopping_center_food_court" including the substring "the_shopping_center".

In some embodiments, entities are matched to candidate parent entity descriptors based on prefix matching. For example, the candidate descriptor string "The University College of Engineering" may be matched to the descriptor string "The University" based on the prefix of the candidate descriptor string (i.e., the beginning of the descriptor string) including the substring of "The University". In some embodiments, entities are matched to parent entity descriptors based on suffix matching. For example, the candidate descriptor string "Admissions Office: The University" may be matched to the descriptor string "The University" based on the suffix of the candidate descriptor string (i.e., the end of the descriptor sting) including the substring "The University". In some embodiments, a candidate descriptor string is matched to the descriptor string having the longest match (e.g., the greatest number of matching words or characters). For example, where candidate parent entities include "The University" and "The University College", the candidate descriptor string "The University College of Engineering" may be matched to "The University College" based on the match including three words (or twenty-two characters/spaces) as opposed to two words (or thirteen characters/spaces) that match with "The University". As a result, the "The University College of Engineering" may be grouped with candidate parent entity of "The University College" and may not be grouped with the candidate parent entity of "The University". In some embodiments, the comparisons may be based on the normalized versions of the descriptors.

Grouping Based on Descriptor/Address:

In some embodiments, an entity is grouped with a candidate parent entity if the entity has an address that includes the descriptor of the candidate parent entity. For example, where "The Shopping Center" is identified as a candidate parent entity, "The Shopping Center Food Court" may be grouped with "The Shopping Center" based on its address of "1 The Shopping Center, Palo Alto, Calif. 94034, US" including the substring "The Shopping Center". In some embodiments the comparisons may be based on the normalized versions of the descriptors and address.

Figure 6:
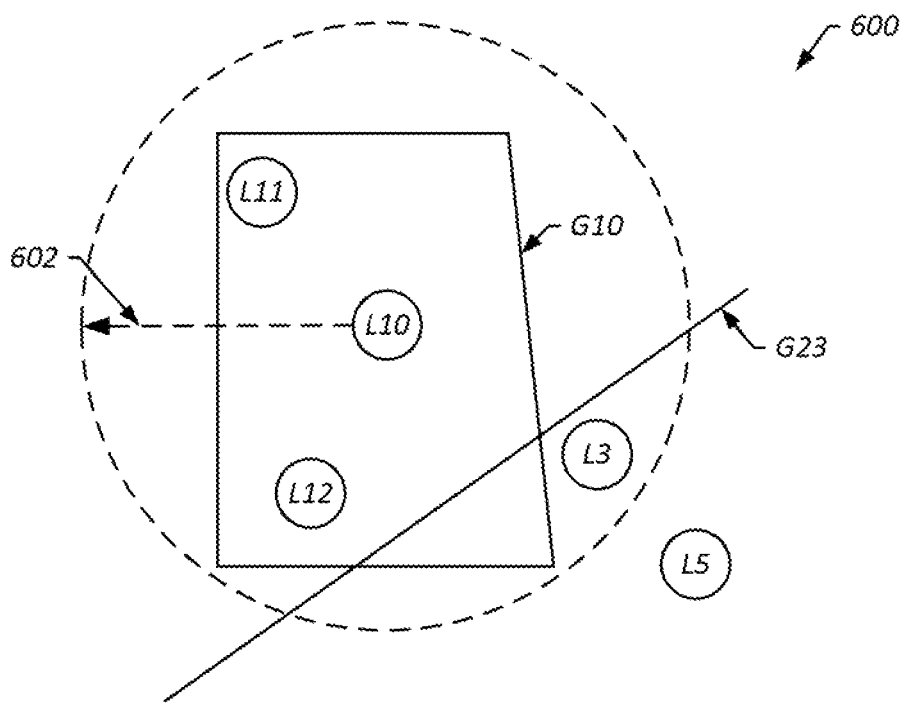
FIG. 6 is a diagram that illustrates a geographic mapping of geometries and locations in accordance with one or more embodiments of the present technique.

Grouping Based on Proximity (e.g., Distance/Radius):

In some embodiments, grouping entities includes grouping entities that are geographical proximate to one another. For example, two or more entities that are close to one another may be grouped together. In some embodiments, an entity is grouped with a candidate parent entity if the entity has a location that is within a threshold distance (e.g., radius) of the candidate parent entity. For example, referring to FIG. 6 (illustrating a geographic mapping 600 of geometries and locations), where a radius 602 of one kilometer (km) is specified, and locations "L3", "L11" and "L12" are within one kilometer of location "L10", "The Store" (having a location of "L3"), "The University College of Engineering" (having a location of "L11") and "Admissions Office: The University" (having a location of "L12") may be grouped with the candidate parent entity entitled "The University" (having a location of "L10") as candidate child entities. In some embodiments, a given entity having a parent classification (e.g., university) is grouped with other entities that are within a given distance (e.g., one kilometer radius) of the given entity and that have a classification (e.g., university_department) that corresponds to a child of the parent classification.

Grouping Based on Polygon Geometry:

In some embodiments, an entity is grouped with a candidate parent entity if the entity has a location that is within a geographic area (e.g., a polygon) associated with the candidate parent entity. For example, referring again to FIG. 6, where locations "L11" and "L12" are within the polygon associated with "G10", "The University College of Engineering" (having a location of "L11") and "Admissions Office: The University" (having a location of "L12") may be grouped with candidate parent entity "The University" (having a geometry of "G10") as candidate child entities. In some embodiments, a given entity having a parent classification is grouped with other entities that are within a geographic area (e.g., within the polygon) associated with the given entity and that have a classification (e.g., store) that corresponds to a child of the parent classification (e.g., shopping_center).

In some embodiments, any combination of two or more of the above described techniques may be employed. For example, a candidate parent entity may be grouped with other entities having a descriptor that includes the descriptor of the candidate parent entity, having an address that includes the descriptor of the candidate parent entity, having a location that is within a threshold distance (e.g., a radius) of the candidate parent entity, and/or having a location that is within a geometry (e.g., a polygon) associated with the candidate parent entity.

Figure 7:
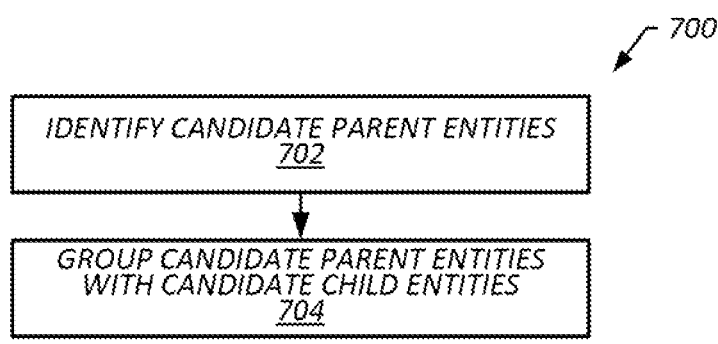
FIG. 7 is a flowchart that illustrates a method of grouping candidate parent entities with candidate child entities in accordance with one or more embodiments of the present technique.

FIG. 7 is a flowchart that illustrates an exemplary method 700 of grouping candidate parent entities with candidate child entities. Method 700 may include identifying candidate parent entities, as depicted at block 702. In some embodiments, identifying candidate parent entities includes identifying entities of an entity set (e.g., the entity set identified at block 102) having a classification that is associated with a parent entity (e.g., shopping center, university, hospital, or the like), having a geometry that is that is associated with a parent entity (e.g., a geometry that includes a polygon/area), and/or a descriptor including keywords associated with a parent entity (e.g., "shopping center", "mall", "shopping mall", and the like). For example, "The Shopping Center" may be identified as a candidate parent entity based on its classification of "shopping_center" and "The University" may be identified as a candidate parent entity based on its classification of "university".

Method 700 may include grouping candidate parent entities with candidate child entities, as depicted at block 704. In some embodiments, a candidate parent entity is grouped with other entities having a descriptor that includes the descriptor of the candidate parent entity, having an address that includes the descriptor of the candidate parent entity, having a location that is within a threshold distance (e.g., a radius) of the candidate parent entity, having a location that is within a geometry (e.g., a polygon) associated with the candidate parent entity, and/or the like. For example, the candidate parent entity of "The Shopping Center" may be grouped with candidate child entities of "Dave's Electronics", "The Suit Store", "ABC Department Store" and "The Shopping Center Food Court" based on each of the candidate child entity addresses including a substring corresponding to the descriptor of "The Shopping Center". As a further example, "The University College of Engineering" and "Admissions Office: The University" may be grouped with candidate parent entity entitled "The University" based on each of their locations being located within a polygon associated with "The University".

In some embodiments, the candidate parent entity for a given grouping is compared to each of the candidate child entities within the grouping to determine whether hierarchical relationships exist there between. For example, "The Shopping Center" may be compared to each of "Dave's Electronics", "The Suit Store", "ABC Department Store" and "The Shopping Center Food Court" to determine whether hierarchical relationships exists there between. Where multiple groupings including two or more entities are identified, comparisons may be provided for each of the groupings such that hierarchical relationships between entities within each of the groupings are identified. For example, in a second grouping, "The University" may be compared to each of "The University College of Engineering" and "Admissions Office: The University" to determine whether hierarchical relationships exists there between.

Hierarchical Relationship Mining:

Method 100 may include identifying hierarchical relationships between entities of the grouping, as depicted at block 106. Identifying hierarchical relationships between entities may be referred to as "hierarchical relationship mining". As a result of hierarchical relationship mining, a parent-child relationship may be identified between two or more entities. For example, hierarchical relationship mining may reveal that "The Shopping Center" and "Dave's Electronics" have a parent-child hierarchical relationship (i.e., "The Shopping Center" is a parent of "Dave's Electronics" and, thus, "Dave's Electronics" is a child of "The Shopping Center"). In some embodiments, hierarchical relation mining includes comparing two or more entities to one another to determine whether or not hierarchical relationships exist there between. For example, "The Shopping Center" may be compared to "Dave's Electronics" to determine whether or not a hierarchical relationship exists between the two entities.

In some embodiments, each of the entities of a database is compared to each of the other entities of the database to identify hierarchical relationships there between. In some embodiments, hierarchical relation mining includes, for each grouping of two or more entities, comparing the entities within the grouping to one another to determine whether or not hierarchical relationships exists there between. In some embodiments, where a candidate parent entity is identified, the candidate parent entity is compared to each of the candidate child entities, and the candidate child entities may or may not be compared to one another.

Figure 8:
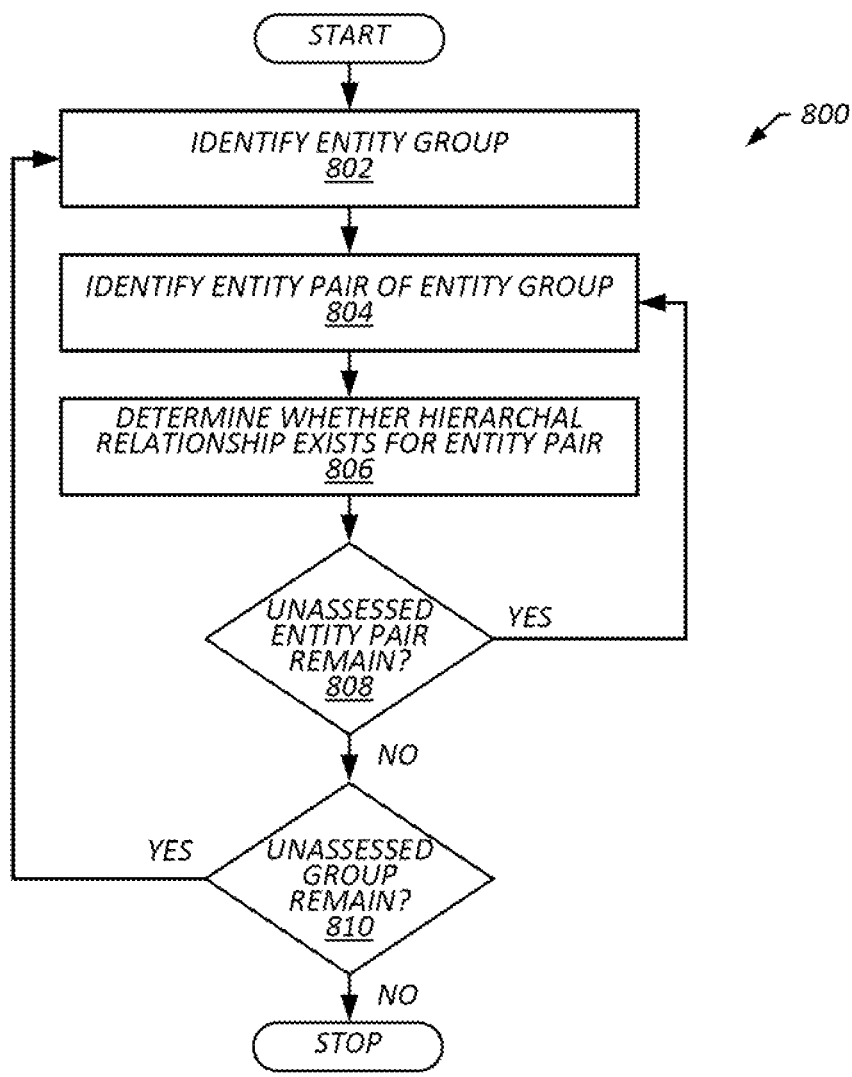
FIG. 8 is a flowchart that illustrates a method of identifying hierarchical relationships between entities of groupings in accordance with one or more embodiments of the present technique.

FIG. 8 is a flowchart that illustrates an exemplary method 800 of identifying hierarchical relationships between entities of groupings. Method 800 may include comparing entity pairs within each of a plurality of groupings identified to determine whether or not a hierarchical relationship exists between the entities. In some embodiments, an entity is only compared with other entities of a grouping to which the entity belongs, thereby helping to reduce comparisons of the entity to seemingly unrelated entities of an entity set. Although, in some embodiments, method 800 is described with regard to comparing entities within the same groupings, similar techniques may be employed between any two entities. For example, the techniques for determining whether or not a hierarchical relationship exists between two entities may be employed between any two entities, regardless of whether or not they are in the same grouping or even in a grouping at all. That is entities of an entity set may be compared to one another using similar techniques regardless of whether or not the entities have been grouped.

Method 800 may include identifying an entity group, as depicted at block 802. Identifying an entity group may include identifying one of the entity groups identified at block 104 of method 100 that has not yet been assessed/mined for hierarchal relationships. FIG. 9 is a table that illustrates an exemplary grouping 900. More specifically, grouping 900 includes the entities of "The Shopping Center", "Dave's Electronics", "The Suit Store", "ABC Department Store" and "The Shopping Center Food Court" which may have been grouped together based on the entities having the same or similar normalized address as discussed above.

Method 800 may include identifying an entity pair of an entity group, as depicted at block 804. Identifying an entity pair of an entity group may include identifying two entities of the grouping (identified at block 802) that have not yet been compared. For example, where group 900 is identified, in a first iteration of step 804, identifying an entity pair of an entity group may include identifying the entity pair of "The Shopping Center" and "Dave's Electronics".

Method 800 may include determining whether a hierarchical relationship exists for the entity pair, as depicted at block 806. Determining whether a hierarchical relationship exists for the entity pair may include comparing various features/characteristics of the two entities. For example, with regard to the entity pair of "The Shopping Center" and "Dave's Electronics", various features/characteristics of "The Shopping Center" may be compared to various features/characteristics of "Dave's Electronics", and a hierarchical relationship, if any, between two entities may be determined based on the comparisons.

In some embodiments, a first entity may be identified as a parent of a second entity where the first entity's geometry includes a polygon and a geometry/location associated with the second entity falls within the polygon. For example, "The Shopping Center" may be identified as a parent of "Dave's Electronics" and "The Suit Store" based on geometries "G6" and "G7" and/or locations "L6" and "L7" falling within a polygon defined by geometry "G2".

In some embodiments, a first entity may be identified as a parent of a second entity where the second entity's address contains the entity descriptor of the first entity. For example, "The Shopping Center" may be identified as a parent of "Dave's Electronics" and "The Suit Store" based on their normalized addresses of "1-the_shopping_center-palo_alto-ca-94034-us" including the string "the_shopping_center".

In some embodiments, a first entity may be identified as a parent of a second entity where the second entity's descriptor contains the descriptor of the first entity. For example, "The Shopping Center" may be identified as a parent of "The Shopping Center Food Court" based on a normalized version of its descriptor (e.g., "the_shopping_center_food_court") including the string "the_shopping_center".

In some embodiments, a first entity is identified as a parent of a second entity where the first entity is associated with a higher number of impressions (e.g., is the subject of the highest number/frequency of searches and/or is displayed in the highest number/frequency of search results) than the second entity. For example, "The Shopping Center" may be identified as a parent of "Dave's Electronics" based on the string "the_shopping_center" being the subject of a higher number/frequency of user search queries and/or appearing in a higher number/frequency of search results than the string "daves_electronics".

In some embodiments, a first entity is identified as a parent of a second entity where a descriptor of the first entity includes a keyword associated with a parent entity and the other entity does not. For example, "The Shopping Center" may be identified as a parent of "Dave's Electronics" based on "The Shopping Center" including the "parent" keyword/phrase of "shopping center" within its descriptor and "Dave's Electronics" not including a "parent" keyword/phrase within its descriptor.

In some embodiments, an identification of a hierarchical relationship between entities is based on assessment of an entity graph. An entity graph may include a plurality of nodes that each correspond to a given entity. Each node of the entity graph may include one or more node attributes that define attributes of the entity. For example, a node corresponding to the entity "The Shopping Center" may include node attributes such as an entity identifier (e.g., "The Shopping Center"), a physical address (e.g., "1 The Shopping Center, Palo Alto, Calif. 94034, US"), a geometry (e.g., "G1") and so forth. Nodes may be connected to other nodes of the entity graph via edges/links. Each of the edges may connect two nodes and may be associated with one or more edge attributes that define a relationship between the two nodes. For example, an edge attribute may specify that one of the two nodes contains the other of the two nodes (e.g., a containment relationship). A hierarchical relationship between entities may be determined based on edge attributes corresponding to the entities. For example, it may be determined that "The Shopping Center" is a parent to "Dave's Electronics" based on an edge attribute that indicates the "The Shopping Center" contains "Dave's Electronics".

In some embodiments, a determination of whether or not a pair of entities has a hierarchical relationship is based on single criteria or a combination of two or more criteria. For example, a hierarchical relationship between two entities may be based on application of multiple criteria and/or weighting of the criteria. Such a technique (i.e., taking into account multiple criteria) may help to provide a higher level of confidence in a determined hierarchical relationship.

In some embodiments, the determination of whether or not a parent-child hierarchal relationship exists between a given entity and the other entity being compared is based on one or more of the following exemplary scoring criteria:

1) The entity's descriptor (e.g., name/title) is contained in the address of the other entity;
2) The entity's descriptor is contained in the descriptor of the other entity;
3) The entity is associated with a higher number of impressions (e.g., the subject of a higher number/frequency of searches and/or is displayed in a higher number/frequency of search results) than the other entity; and
4) The entity includes a parent "keyword" in its descriptor.

Although four exemplary criteria are provided, similar techniques may be used for combinations of any type or number of criteria.

In some embodiments, for the comparison of two entities of an entity pair, each of the entities is scored based on the criteria that it satisfies. For example, where "The Shopping Center Food Court" is associated with a higher number of impression than "The Shopping Center", "The Shopping Center Food Court" may receive a total score of "1" for satisfying the third criteria listed above and "The Shopping Center" may receive a total score of "3" for satisfying the first, second and fourth criteria listed above. In some embodiments, the entity of the entity pair that receives the highest total score is determined to be a "parent" to the other entity of the entity pair. For example, "The Shopping Center" may be identified as a parent of "The Shopping Center Food Court" based on "The Shopping Center" receiving a higher total score than "Dave's Electronics".

In some embodiments, the criteria are weighted to generate a weighted score. For example, the first criteria may have a value of "1", the second criteria may have a weighted value of "0.7", the third criteria may have a weighted value of "0.4", and the fourth criteria may have a weighted value of "0.4". Thus, where "The Shopping Center Food Court" is associated with a higher number of impression than "The Shopping Center", "The Shopping Center Food Court" may receive a total score of "0.4" for satisfying the third criteria and "The Shopping Center" may receive a total score of "2.1" for satisfying the first, second and fourth criteria. Accordingly, "The Shopping Center" may be identified as a parent of "The Shopping Center Food Court" based on "The Shopping Center" receiving a higher total score than "The Shopping Center Food Court". Criteria that are more indicative of an entity being a parent may be weighted more heavily than criterion that are less indicative of an entity being a parent.

In some embodiments, an entity's total score needs to be above a threshold before it is determined that a hierarchical relationship exists. For example, an entity may be required to have a total score of "2" or greater, in addition to being greater than a total score of the other entity of the entity pair, in order for the entity to be determined to be a parent of the other entity. Such embodiment threshold may help to ensure that a sufficient amount of criteria has been met to confidently identify that a hierarchical relationship exists between the two entities. Thus, for example, where both of the entities being compared have total scores that fall below the threshold, no hierarchical relationship may be identified, regardless of which entity has a higher total score.

In some embodiments, upon identifying whether a hierarchical relationship exists for an entity pair, method 800 may include determining whether any un-assessed entity pairs remain, as depicted at block 808. In some embodiments, determining whether any un-assessed entity pairs remain includes determining whether any entity pairs of the group identified at block 802 have not yet been assessed. For example, where only the entity pair of "The Shopping Center" and "The Shopping Center Food Court" has been compared, it may be determined that at least the entity pairs of "The Shopping Center" and "Dave's Electronics", "The Shopping Center" and "The Suit Store", "The Shopping Center" and "ABC Department Store", and so forth have not yet been assessed. Method 800 may include returning to block 804 to identify an entity pair (e.g., an un-assessed entity pair of group 900), such as the entity pair of "The Shopping Center" and "The Suit Store", and conducting a determination of whether a hierarchical relationship exists there between in a manner similar to that discussed with regard to block 806. Such iterations may continue until all of the entity pairs of the group have been assessed.

Upon iterating through comparisons for all of the entity pairs of that are to be assessed for the currently identified group, method 800 may include determining whether or not an un-assessed group remains. In some embodiments, determining whether any un-assessed group remains includes determining whether any groups identified at block 104 have not yet been assessed. For example, where only group 900 has been assessed, it may be determined that at least the group including "The University", "The University College of Engineering" and "Admissions Office: The University" has not yet been assessed, and method 900 may include returning to block 802, and providing for comparisons of the entities of "The University", "The University College of Engineering" and "Admissions Office: The University" in a manner similar to that discussed with regard to at least blocks 804 and 806. The iterations may continue until all of the groups that are to be assessed, have been assessed. Accordingly, in some embodiments, the comparison of entity pairs may continue until each of the entity pairs of each of the identified grouping have been subject to a determination of whether or not a hierarchical relationship exists there between.

Generate Hierarchical Index:

In some embodiments, hierarchical relationships identified are stored or otherwise recorded. For example, upon identifying hierarchical relationships between entities of the grouping (e.g., as discussed with regard to at least block 106 and/or method 800), method 100 may include generating a hierarchical index indicative of the hierarchical relationships identified, as depicted at block 108 of method 100 of FIG. 1.

With regard to at least grouping 900 of FIG. 9, for example, where it is determined that "The Shopping Center" is a parent entity to "Dave's Electronics", "The Suit Store", "ABC Department Store" and "The Shopping Center Food Court", a hierarchal index (e.g., a database table, database index, or similar data structure) may be generated that is indicative of the hierarchical relationships. FIG. 10 illustrates an exemplary updated database table 200', including an indication of identified hierarchical relationships. Table 200' indicates that "The Shopping Center" is a parent of "Dave's Electronics", "The Suit Store", "ABC Department Store", and "The Shopping Center Food Court", as indicated by identifiers of "N6", "N7", "N8", and "N9" being listed under children for "The Shopping Center" and/or by the identifier "N2" being listed under parents for each of "Dave's Electronics", "The Suit Store", "ABC Department Store", and "The Shopping Center Food Court". FIG. 11 illustrates an exemplary hierarchical index 1100 including an indication of identified hierarchical relationships for at least grouping 900.

Database table 200' and/or hierarchical index 900 may be stored in a datastore. For example, database table 200' and/or hierarchical index 900 may be stored in a database accessible by a server (e.g., datastore 2210 of a server 2202 discussed in more detail below with regard to at least FIG. 22) for use in identifying hierarchical relationships of entities. For example, upon identifying a set of search results that includes a search result corresponding to the entity "The Shopping Center", database table 200' or hierarchical index 1100 may be assessed to determine that "The Shopping Center" is a parent entity, and to identify "Dave's Electronics", "The Suit Store", "ABC Department Store" and "The Shopping Center Food Court" as children of "The Shopping Center". A hierarchical listing of search results may be generated and displayed that includes a search results for "The Shopping Center" followed by an indented listing of child results for "Dave's Electronics", "The Suit Store", "ABC Department Store" and "The Shopping Center Food Court" as discussed herein. Content including similar hierarchical listings of results may be provided in other context, such as a "place page" for an entity.

Figure 12:
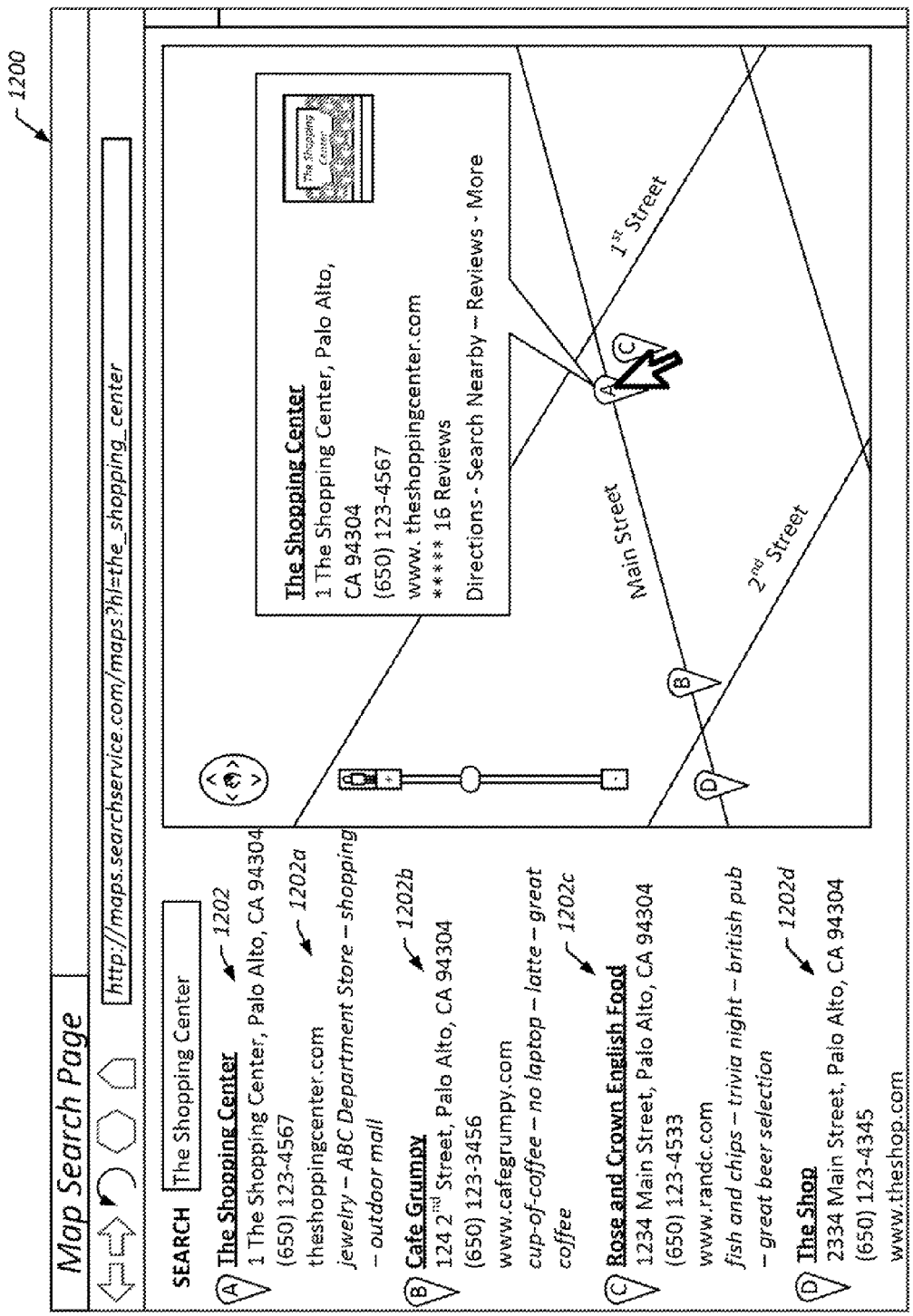
FIG. 12 depicts an exemplary webpage including search results in accordance with known prior art techniques.

Displaying Results Indicative of Hierarchical Relationships:

Existing techniques for providing search results do not appear to include at least features of identifying results associated with hierarchical relationships (e.g., child/parent search results), much less providing for the display of parent and/or child results in a hierarchical manner. FIG. 12 depicts an exemplary webpage 1200 including search results in accordance with known prior art techniques. Webpage 1200 includes an exemplary listing of search results 1202 that may be generated in response to a map-based search query. As depicted, search results 1202 include an exemplary listing of four search results 1202a, 1202b, 1202c and 1202d (collectively referred to herein as search results 1202) that may be provided in response to a user initiated search for the "The Shopping Center". Each of search results 1202 includes general information corresponding to the search result. For example, search results 1202a, 1202b, 1202c and 1202d each include a hyperlink to a corresponding webpage, contact information (e.g., a physical address and/or a phone number) and a uniform resource locator (URL) corresponding to the search result.

Some of search results 1202 include a listing of associated terms/phrases. For example, search result 1202b includes the associated terms/phrases of "cup-of-coffee", "no laptop", "latte", "great coffee". The associated terms/phrases may include terms and phrases that are frequently used to describe the search result, and may be derived from sources across the Internet, such as reviews, web pages and other online references. The associated terms may be provided in an attempt to provide contextual information to the user, helping them to quickly identify general characteristics of the entity corresponding to the search result. For example, after seeing the term "no laptop", a user may be able to quickly determine that the "Cafe Grumpy" does not allow the use of laptops. As depicted, the keywords may simply include an "inactive" listing of keywords that are not selectable and/or do not include hyperlinks that can be selected to navigate to a corresponding webpage).

In some instances, associated terms may happen to list an entity that is a child of an entity corresponding to the search result. For example, with regard to search result 1202*a*, an associated term may include "ABC Department Store", a store that is located within "The Shopping Center". Although the associated terms may be based on various associations with the search result, they do not appear to be derived from a hierarchical relation to the search result. For example, the term "ABC Department Store" does not appear to have been identified based on a targeted search for child/parent entities related to the "The Shopping Center". Accordingly, a user may not be able to reliably identify any hierarchical relationship between the search result identified and the associated terms based on the displayed search results. That is, the mere presence of the associated text "ABC Department Store" does not provide a reliable indication that "ABC Department Store" is located within the "Shopping Center".

Figure 13:
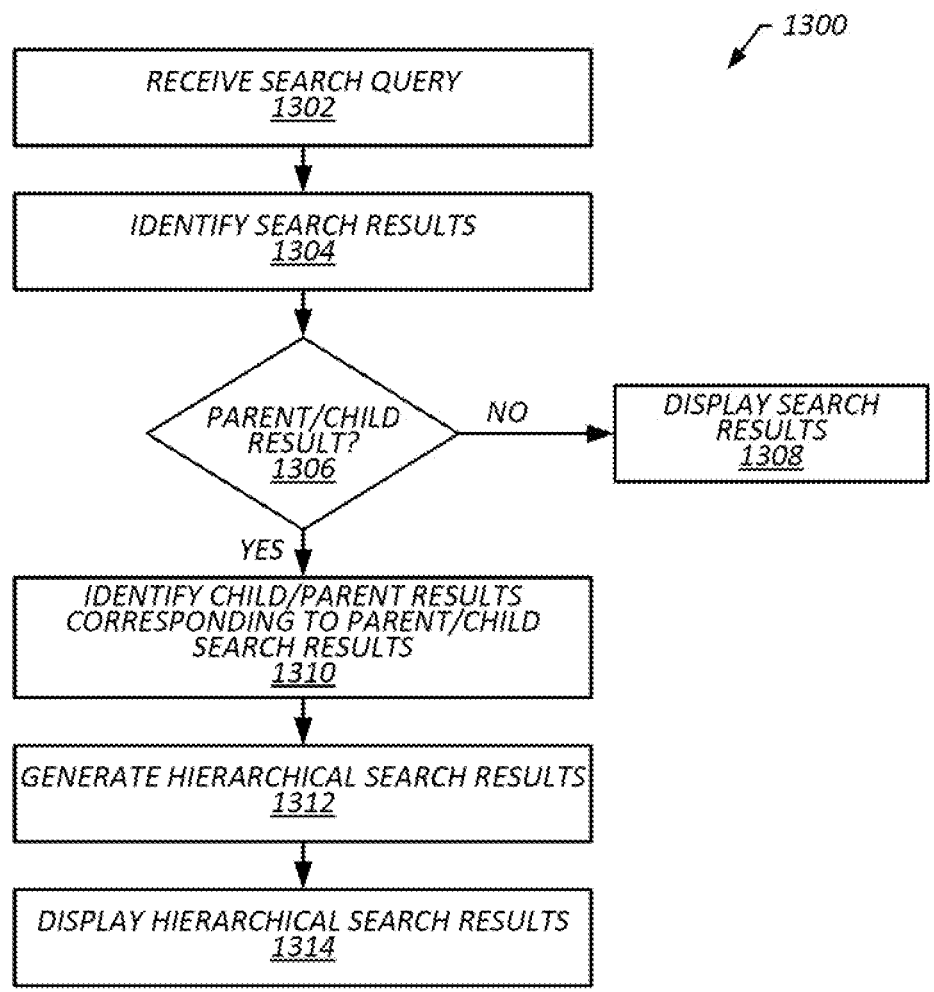
FIG. 13 is a flowchart that illustrates a method of processing a search query in accordance with one or more embodiments of the present technique.

FIG. 13 is a flowchart that illustrates an exemplary method 1300 of processing a search query. Method 1300 may generally include receiving a search query, identifying search query results, determining whether or not the search query results include a parent or a child search result, and where the search query results include one or more parent or child search results, identify children or parent results corresponding to the one or more parent or child search results, and generating and displaying hierarchical query results.

Method 1300 may include receiving a search query, as depicted at block 1302. Receiving a search query may include a search server receiving a user search submitted via a search website. For example, a user may submit a search for "Shopping Palo Alto" via a keyword search field of a search webpage or the like.

Method 1300 may include identifying search query results, as depicted at block 1304. Identifying search query results may include searching a search engine database/index to identify a set of results that are relevant to the search query. For example, in response to a search query for "Shopping Palo Alto", a search engine may search through entries of a search index (e.g., table 200' or index 1100) to identify search results that correspond to "Shopping Palo Alto". In some embodiments, a search engine may employ specific search algorithms to locate the most relevant results.

FIG. 14 is a table that illustrates an exemplary set of search results 1400. For example, search results 1400 may include an exemplary set of search results generated by a search engine in response to a keyword search query for "Shopping Palo Alto". In some embodiments, the set of search results may be ranked such that search results having higher levels of relevancy are ranked higher than search results having lower levels of relevancy.

Method 1300 may include determining whether the search results include one or more parent results and/or child results, as depicted at block 1306. Determining whether the search results include a parent result and/or a child result may include assessing each of the search results to determining whether any of the search results corresponds to a parent and/or a child entity. For example, with regard to set of results 1400, each of the search results may be assessed to determine whether or not any of the search results are a parent or a child search result. It may be determined that a search result is a parent or a child search result where a corresponding hierarchical index (e.g., database table 200' and/or hierarchal index 1100) lists at least one child and/or parent for an entity corresponding to the search result. For example, it may be determined that the search result for "The Shopping Center" is a parent search result based at least on database table 200' and/or hierarchical index 1100 including identifiers of "N6", "N7", "N8" and "N9" being listed as children 216 for the entry corresponding to "The Shopping Center". As a further example, it may be determined that the search result for "Clothing Connection" is a child search result based at least on database table 200' and/or hierarchical index 1200 including the identifier of "N4" being listed under children 216 for the entry corresponding to "Clothing Connection". Accordingly, it may be determined that set of search results 1400 includes a parent result and a child result based at least on the assessment of the search results corresponding to "The Shopping Center" and "Clothing Connection". Similar assessment and determinations may be made for each of the other search results.

Where it is determined that search results do not include at least one parent or child search result, method 1300 may proceed to providing for the display of the search results for display, as depicted at block 1308. Providing search results for display may include displaying a search results webpage that includes a listing of search results corresponding to set of search results 1400. In some embodiments, the search results may be displayed in a flat listing, similar to that depicted and described with regard to FIG. 12. For example, results may be displayed in a ranked listing including one result listed after the other in the ranked order of search results 1400 and the displayed listing may not include any visible indication of hierarchical relationships between the search results.

Where it is determined that the search query results do include one or more parent or child search results, method 1300 may proceed to identifying child/parent results corresponding to the one or more parent/child query results, as depicted at block 1310. Identifying child results corresponding to the parent results may include, for each parent result of the preliminary query results, identifying a set of one or more child results corresponding to the parent result. For example, "Dave's Electronics", "The Suit Store", "ABC Department Store", and "The Shopping Center Food Court" may be identified as child results based at least on table 200' and/or hierarchical index 1100 including identifiers of "N6", "N7", "N8" and "N9" listed as children 216 for "The Shopping Center". In database table 200' and hierarchical index 1500, indices corresponding to only four children are listed for "The Shopping Mall" for illustrative purposes, although any number of children may be associated with a given parent entity. For example, "The Shopping Center" may include a total of one-hundred sixty-six children corresponding to one-hundred sixty-six stores located at "The Shopping Center". Identifying parent results corresponding to the child results may include, for each child result of the set of search results, identifying a set of one or more parent results corresponding to the child result. For example, with regard to the child result for "Clothing Connection", "Palo Alto Mall" may be identified as a parent result based at least on table 200' and/or hierarchical index 1100 including the identifier of "N4" being listed under children 216 for "Clothing Connection".

FIG. 15 is a table that illustrates an exemplary listing of child search results 1500. Child search results 1500 may include a ranked listing of child search results corresponding to the parent search result for "The Shopping Center". Although only the four highest ranked child results are listed for illustrative purposes, a set of child search results may include any number of child search results associated with a given parent entity. For example, set of child results 1500 may include a ranked listing of all one-hundred sixty-six child results corresponding to the one-hundred sixty-six stores located at "The Shopping Center".

In some embodiments, identifying child/parent results corresponding to the parent/child search results may include identifying a subset of child/parent entities/results that are to be provided for display in association with the parent/child search result. Where space on a webpage is limited, only a given number of the highest ranked child/parent results may be identified for display. For example, with regard to set of child results 1500, only the three highest ranked child results of "The Suit Store", "ABC Department Store" and "Dave's Electronics", may be identified as child results to be displayed, at least initially, in association with the parent search result for "The Shopping Center".

Method 1300 may include generating hierarchical search results, as depicted at block 1312. In some embodiments, generating hierarchical search results may include combining the set of child and/or parent results with the set of search results to generate a set of query results including a hierarchical query result.

FIG. 16 is a table that illustrates an exemplary set of hierarchical search results 1600 including corresponding hierarchical search results 1602. A first hierarchical search result 1602a includes a parent search result 1604b corresponding to "The Shopping Center" and a set of child search results 1604c, 1604d and 1604e correspond to "The Suit Store", "ABC Department Store" and "Dave's Electronics". A second hierarchical search result 1602b includes a child search result 1604f corresponding to "Clothing Connection" and a parent search result 1604g for "Palo Alto Mall".

Method 1300 may include providing for the display of the hierarchical search results, as depicted at block 1314. In some embodiments, providing hierarchical results for display includes serving and displaying a webpage, or similar content page, that includes at least one hierarchical search result.

Figure 17:
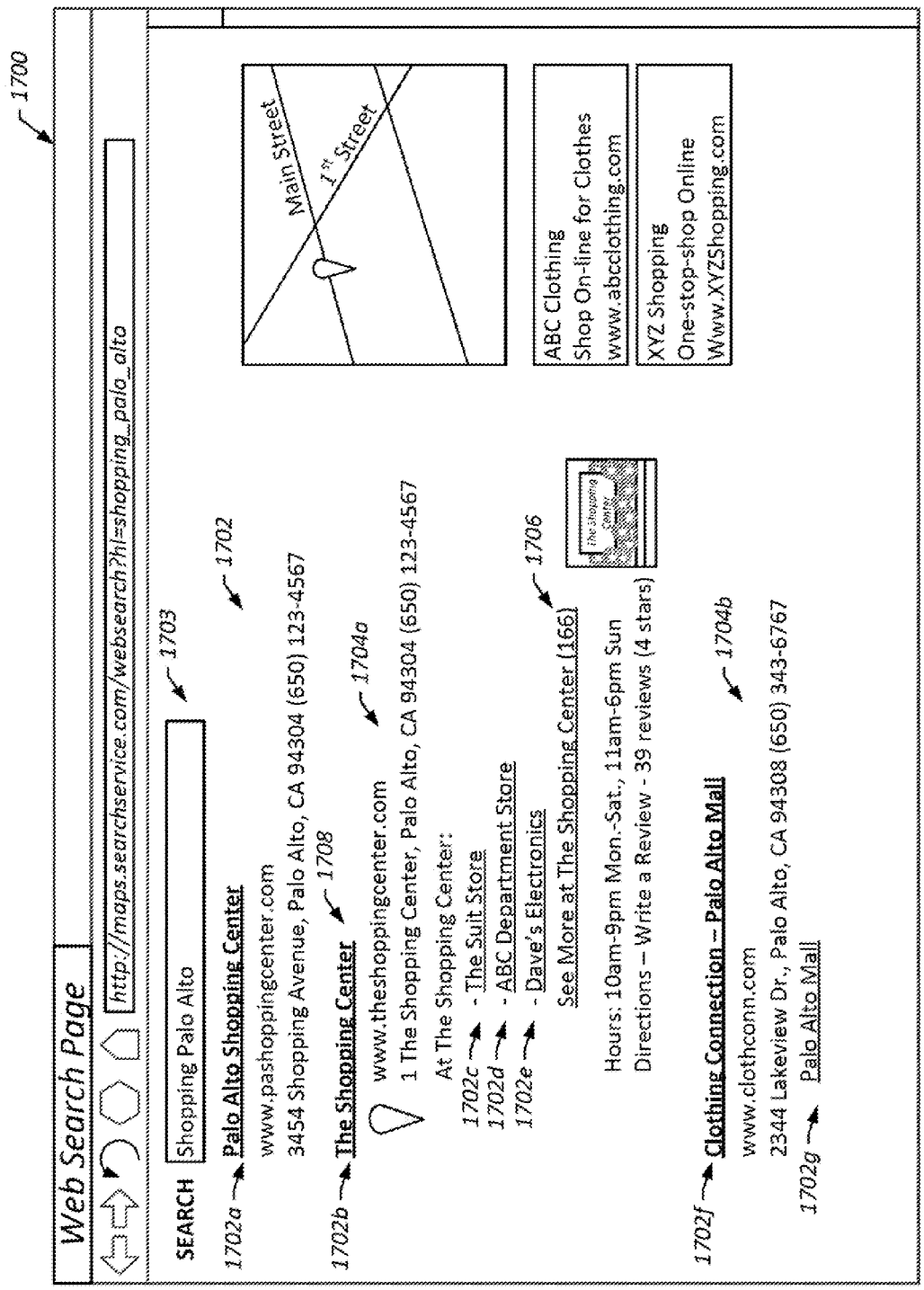
FIGS. 17 and 18 illustrate exemplary search results webpages in accordance with one or more embodiments of the present technique.

FIG. 17 illustrates an exemplary search results webpage 1700 including hierarchical search results 1702. Webpage 1700 may be generated, served and displayed in response to a web-based keyword search query. For example, a user may enter and submit the search keyword "Shopping Palo Alto" via a search field 1703, a corresponding search query may be submitted to a search server (e.g., a search engine), the search server may process the search query to generate a hierarchical listing of search results, and generate and serve webpage 1700 for display via a graphical user interface.

Search results 1702a-1702g may correspond to search results 1604a-1604g of the hierarchical set of search results 1600. In some embodiments, results may include information for an entity that corresponds to the result. For example, the search results 1602 may include a URL, an address, a phone number, business hours and the like for an entity corresponding thereto. Results may include active hyperlinks (as indicated by underlined text) that are user selectable to navigate to a webpage or similar location comprising content corresponding to the result. For example, a user may select the link "The Shopping Center" to navigate to the webpage for the "The Shopping Center" having a URL address of "www.theshoppingcenter.com". In some embodiments, selection of a link may provide for navigation to a place-page for an entity that corresponds to the result.

In some embodiments, the results include one or more search results that are not parent or child search results (e.g., non-hierarchical search results). For example, result 1702a may correspond to "Palo Alto Shopping Center" which may not be a parent search result or a child search result.

In some embodiments, the results include one or more hierarchical search results. For example, search results 1702 include a first hierarchical search result 1704a corresponding to "The Shopping Center". Hierarchical search result 1704a includes parent search result 1702b, and a set of child search results 1702c-1702e corresponding to "The Suit Store", "ABC Department Store" and "Dave's Electronics". As a further example, search results 1702 include a second hierarchical search result 1704b corresponding to "Clothing Connection". Hierarchical search result 1704b includes a child search result 1702f and a parent search result 1702g corresponding to "Palo Alto Mall".

In some embodiments, hierarchically related parent and child search results may be displayed in a hierarchal relationship to one another such that a user can readily identify the child-parent hierarchal relationship between the search results. For example, parent search result for "The Shopping Center" may be followed by an indented listing of child search results corresponding to "The Suit Store", "ABC Department Store" and "Dave's Electronics". The indented listing may be located below the parent search result for "The Shopping Center" and above the next search result for "Clothing Connection". As a further example, child search result for "Clothing Connection" may be followed by indented parent search result corresponding to "Palo Alto Mall" indicative of an inverse-hierarchical relationship that includes the parent visually displayed below the corresponding child search result. Although the illustrated embodiment includes an indented listing, a hierarchical relationship between search results may be indicated in any suitable fashion. For example, a hierarchical relationship may be indicated via use of different fonts, font sizes, textual colors, arrangements, headings (e.g., "At The Shopping Center") or the like.

In some embodiments, hierarchical results include only a subset of the corresponding results. For example, hierarchical search result 1704a includes only child search results 1702c-1702e (e.g., "The Suit Store", "ABC Department Store" and "Dave's Electronics") displayed in hierarchical association with parent search result 1702b.

In some embodiments, hierarchical results include a hyperlink to an expanded listing of results. For example, hierarchical search result 1704a may include an expansion link 1706 entitled "See More at The Shopping Center (166)". The expansion link may be user selectable to expand the displayed listing and/or provide for navigation to a webpage, such as a place page for "The Shopping Center", including an expanded listing of some or all of the child search results corresponding to the one-hundred and sixty-six stores at "The Shopping Center". Webpage 1700 may include other content, such as a map corresponding to one or more of the search results, advertisements, photos and the like.

Figure 18:
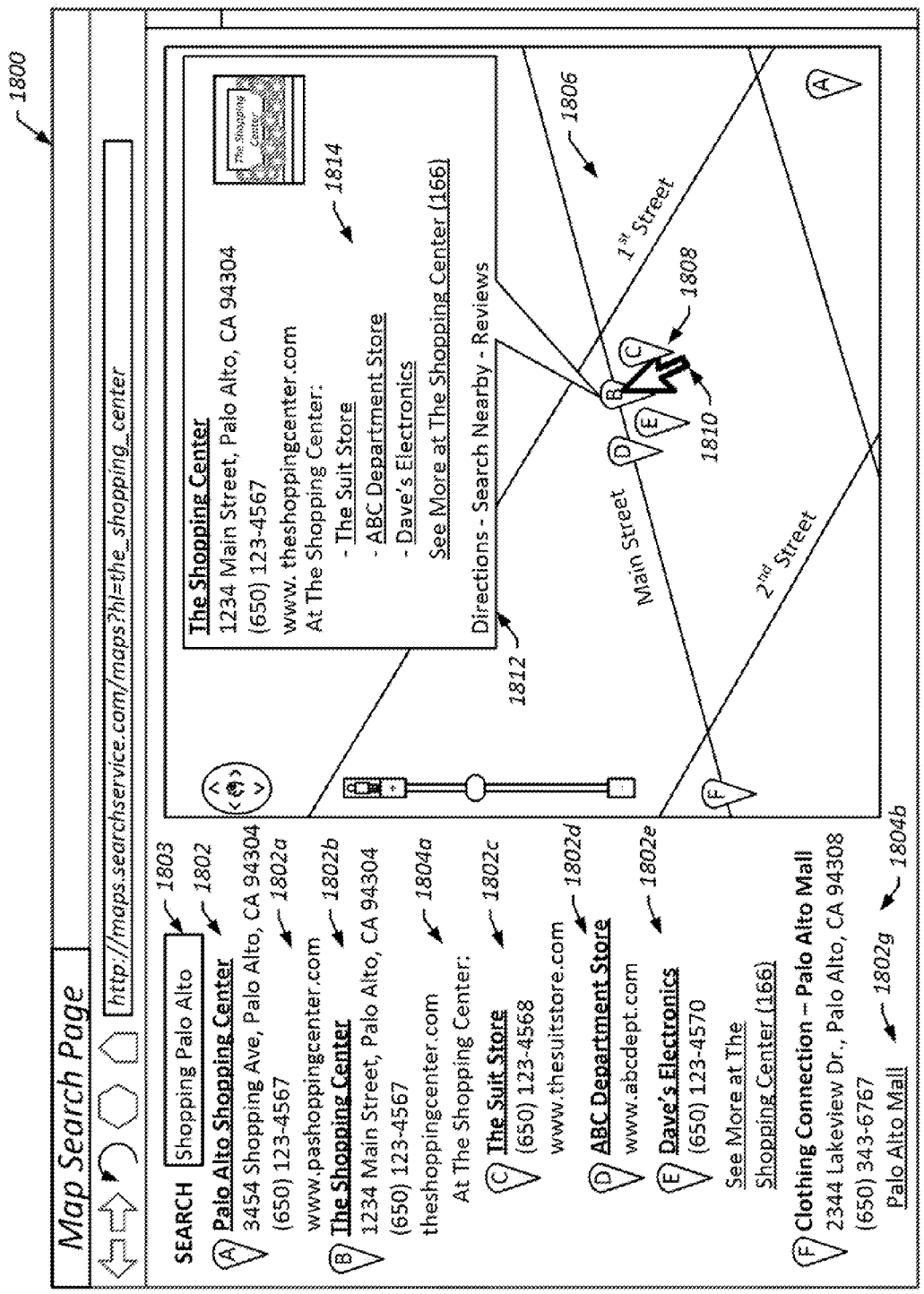

FIG. 18 illustrates an exemplary search results webpage 1800 including display of search results 1802. Webpage 1800 may be generated, served and displayed in response to a map-based search query. For example, a user may enter and submit the search string "Shopping Palo Alto" via a search field 1803, a corresponding search query may be submitted to a search server (e.g., a search engine), the search server may process the search query to generate and serve webpage 1800 for display via a graphical user interface.

In some embodiments, hierarchical search results 1802 are the same or similar to search results 1702 and may be displayed in webpage 1800 in a manner that is the same or similar to the display of hierarchical search results 1702 of webpage 1700. For example, webpage 1800 may include search results 1802a-1802g, including hierarchical search results 1804a and 1804b displayed in a manner similar to that described above with regard to FIG. 17.

In some embodiments, webpage 1800 includes search results 1802 displayed in a left pane of webpage 1800 and a geographic map 1806 displayed in a right pane of webpage 1800. Geographic map 1806 may include a mapping of a region corresponding to one or more of search results 1802. For example, geographic map 1806 may include a map of the geographic region containing locations of "The Shopping Center", "The Suit Store", "ABC Department Store", "Dave's Electronics" and "Clothing Connection" (as indicated by corresponding pins/markers 1808 labeled "B"-"F").

In some embodiments, map 1806 includes an interactive map that, upon user interaction with a maker 1808 corresponding to the given search result, provides an information window (e.g., bubble) corresponding to the search result. For example, upon a user hovering over, or otherwise selecting, a maker/pin corresponding to "The Shopping Center" (e.g., maker 1808 labeled "B") with cursor 1810, bubble 1812 may be displayed. In some embodiments, a bubble may include information for the corresponding result. For example, bubble 1812 may include entity information (e.g., hyperlink, URL address, physical address, a phone number, business hours and so forth) corresponding to the "The Shopping Center". In some embodiments, where the result corresponding to a given bubble includes a parent/child result, the bubble may include a corresponding hierarchical result. For example, bubble 1812 may include a hierarchical result 1814 corresponding to "The Shopping Center". Hierarchical result 1814 may include information that is the same or similar to that of hieratical result 1804a. As a further example, if a user were to select maker "F" corresponding to the search result for "Clothing Connection", a bubble may be displayed that includes content similar to that of hierarchical search result 1804b. Hierarchical results displayed in a bubble may be displayed in a hierarchal manner such that a user can readily identify a child-parent hierarchal relationship between the result and related entities/results.

Figure 19:
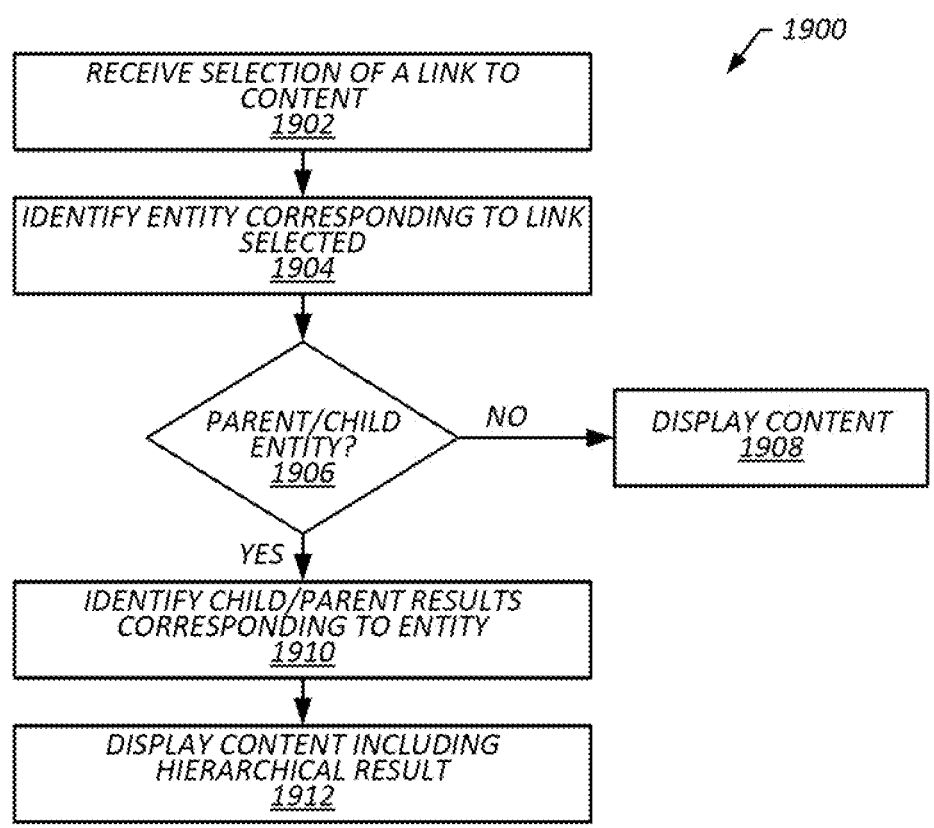
FIG. 19 is a flowchart that illustrates a method of displaying content (e.g., a bubble) with hierarchical results in accordance with one or more embodiments of the present technique.

FIG. 19 is a flowchart that illustrates an exemplary method 1900 of displaying content (e.g., a bubble) with hierarchical results. Method 1900 may include receiving a selection of a link to content, as depicted at block 1902. Receiving a selection of a link to content may include receiving a selection of marker 1808 labeled "B". Method 1900 may include identifying an entity corresponding to the link to content selected, as depicted at block 1904. Where maker 1908 labeled "B" has been selected, identifying an entity corresponding to the link to content selected may include identifying the entity of "The Shopping Center". Method 1900 may include determining whether or not the entity is a child/parent entity, as depicted at block 1906. For example, it may be determined that the "The Shopping Center" is a parent entity based at least on table 200' and/or hierarchical index 1100 including identifiers of "N6", "N7", "N8" and "N9" being listed as children 216 for the entry corresponding to "The Shopping Center". As a further example, where a marker corresponding to "The Shop" is selected, it may be determined that "The Shop" is a not parent or child entity based at least on table 200' and/or hierarchical index 1100 not including any identifiers listed under children 216 or parents 218 for the entry corresponding to "The Shop".

Where it is determined that the entity is not a parent or child entity, method 1900 may include proceeding to displaying the content, including information about the entity, as depicted at block 1908. For example, where a marker for "The Shop" is selected a bubble may be displayed that includes a result for "The Shop" (e.g., a hyperlink to a website for "The Shop", contact information for the shop, and so forth). Where it is determined that the entity is a parent or child entity, method 1900 may include proceeding to identifying child/parent results corresponding to the entity, as depicted at block 1910. Identifying child results corresponding to the parent results may include, identifying a set of one or more child results corresponding to the entity. For example, where a marker for "The Shop" is selected "Dave's Electronics", "The Suit Store", "ABC Department Store", and "The Shopping Center Food Court" may be identified as child results based at least on table 200' and/or hierarchical index 1100 including identifiers of "N6", "N7", "N8" and "N9" being listed as children 216 for the entry corresponding to "The Shopping Center".

Method 1900 may include displaying content including a hierarchical result, as depicted at block 1912. In some embodiments, displaying content including a hierarchical result includes serving and displaying content that includes at least one hierarchical result. For example, in response to the marker for "The Shop" being selected, content for bubble 1812, including a hierarchical result for "The Shopping Center" (e.g., including a parent result for "The Shopping Center" displayed in hierarchical association with child results for "The Suit Store", "ABC Department Store", and "Dave's Electronics"), may be displayed as depicted in FIG. 18. Similar content may be provided upon the selection of a link to content corresponding to a child entity. For example, where a user selects a marker corresponding to "Clothing Connection" a bubble may be served and displayed that includes a result for "Clothing Connection" and a parent result for "Palo Alto Mall" displayed in hierarchical association with one another in a manner similar to that of hierarchical result 1904b.

Method 1900 may be employed in various other contexts, such as upon a user request to navigate to a place page for a given entity. For example, upon a user selection of a hyperlink for "The Shopping Center", it may be determined that "The Shopping Center" is a parent entity, child results may be identified and a place page including a listing of the child results may be displayed.

Figure 20A:
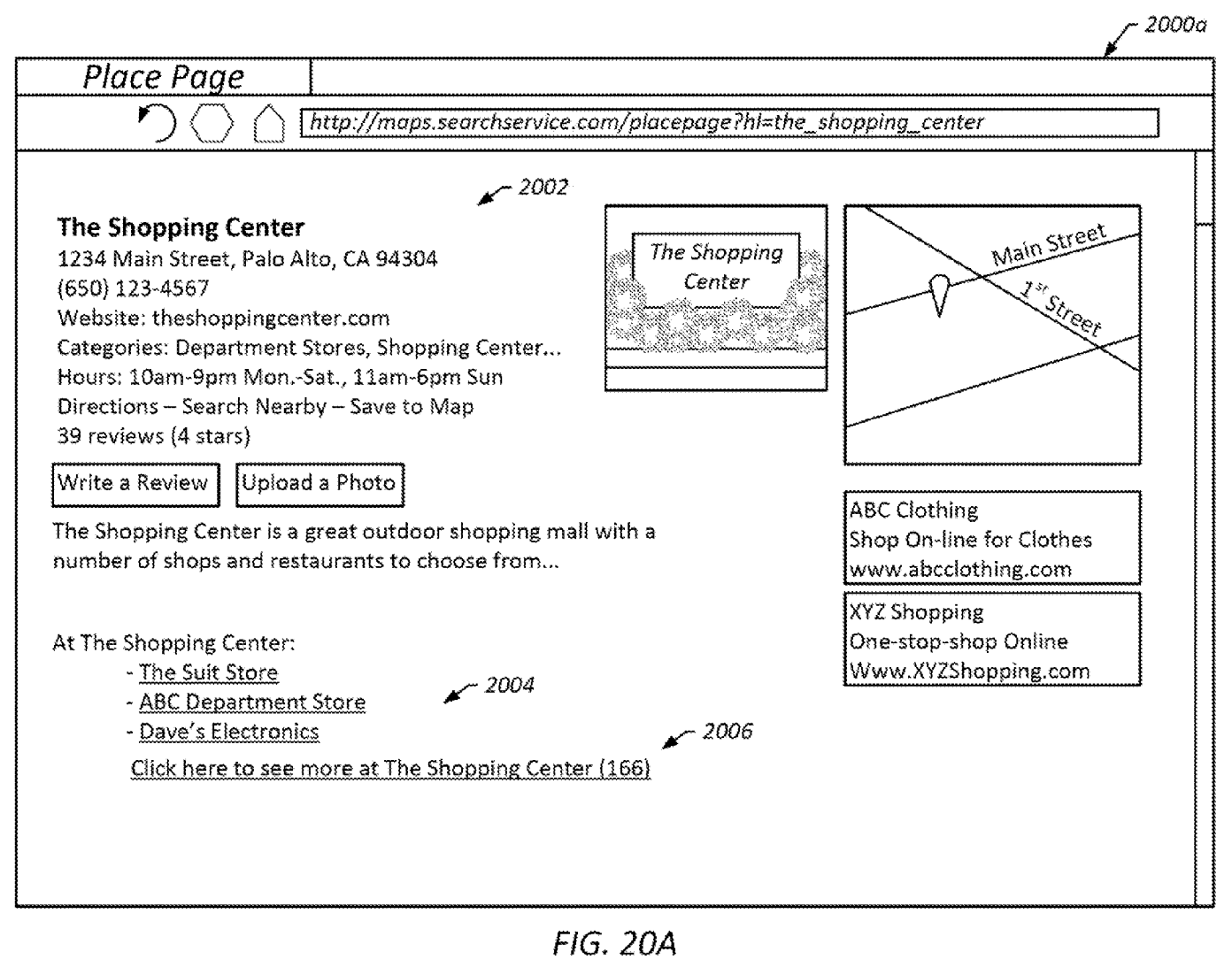
Figure 20B:
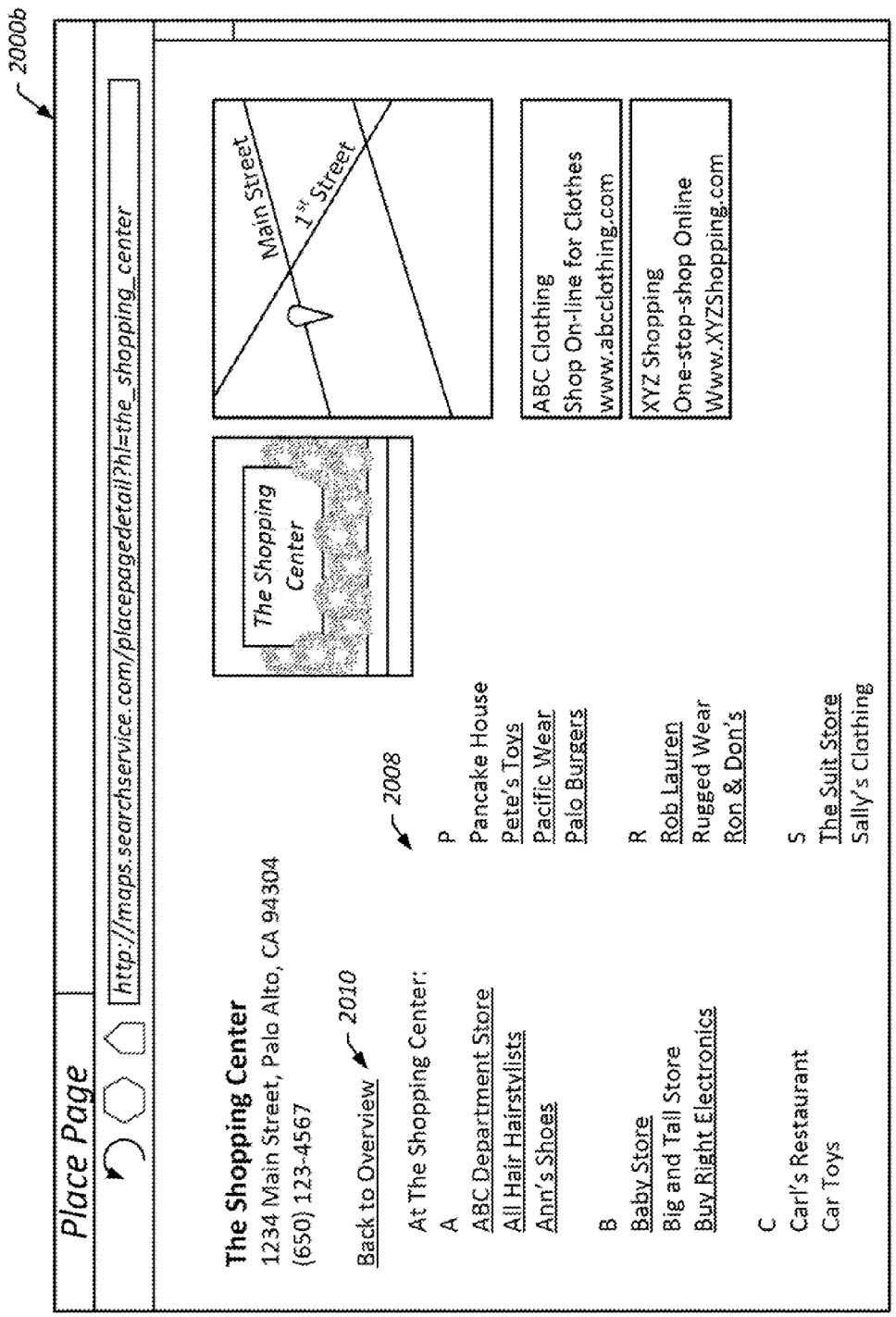

FIG. 20A illustrates an exemplary place page 2000a including a set of results. Place page 2000a may include a place-page for "The Shopping Center". A place-page may include webpage that includes information about a particular geographic place (e.g., a business, point of interest, transit station, neighborhood, landmarks, city and so forth). A place-page may include contact information for the given place, photographs/images relating to the place, reviews for the place, and so forth. For example, place page 2000a may include a place-page for "The Shopping Center" that provides information 2002 including a descriptor, address, phone number, a classification, hours of operation, reviews, a brief description, photos, a map and related advertisements. In some embodiments, a place-page is accessible via selecting a corresponding link a map-based search. For example, a user may be directed to place page 2000a upon selection of the link for "The Shopping Center" of search result 1702b of webpage 1700 or and/or the link for "The Shopping Center" in result 1802b of webpage 1800 or result 1814 in bubble 1812.

In some embodiments, a place-page that corresponds to a parent entity includes a listing of some or all of the child or parent entities corresponding thereto. For example, place page 2000a for "The Shopping Center" may include hierarchical result 2004 including child results for "The Suit Store", "ABC Department Store" and "Dave's Electronics". In some embodiments, result 2004 corresponds to a set of child results identified for "The Shopping Center".

In some embodiments, a place-page includes a hyperlink to an expanded listing of results such that a user can navigate to the expanded listing of results. For example, webpage 2000a includes a link 2106 entitled "Click here to see more at The Shopping Center (166)" that may be selected to navigate to an expanded listing of some or all of the one-hundred and sixty-six child results corresponding to the one-hundred and sixty-six stores at "The Shopping Center". Upon selection of hyperlink 2006, listing of child search results may be expanded and/or the user may be redirected to place page 2000b of FIG. 20B. Place page 2000b may include an expanded listing of some, substantially all, or all of the corresponding child and/or parent search results. For example, place page 2000b may include an expanded listing 2008 including all one-hundred and sixty-six search results corresponding to the one-hundred and sixty-six stores at "The Shopping Center". In some embodiments, a user can unexpanded the results and/or navigate back to webpage 2000a by simply selecting link 2010 entitled "Back to Overview". A similar set of parent search results may be provided in a place-page corresponding to a child entity. For example, a place-page for the "Clothing Connection" may include a parent search result for "Palo Alto Mall" displayed therein.

Promoting Parent Results Ahead of Child Results:

In some embodiments, results are arranged relative to one another based on their hierarchical relationships such that results corresponding to parent entities are displayed more prominently than results corresponding to child entities (e.g., parent results listed above child results). For example, in some embodiments, where a raw listing of results includes a mix of parent results ("P") and child results ("C") (e.g., C, C, P, C, P, C, P), the listing of results may be reordered to generate a hierarchically ordered listing of results including the parent results listed ahead of the child results (e.g., P, P, P, C, C, C). In some embodiments, a listing of results displayed to a user may correspond to the ordering of the hierarchical arranged listing of results.

In some embodiments, a hierarchically ordered listing of results includes results of search queries. For example, a hierarchically ordered listing of results may be provided in search results webpages (e.g., similar to those of webpages FIGS. 12, 17 and/or 18) where the parent results are listed ahead of the child results.

In some embodiments, a hierarchically ordered listing of results includes a listing of geographic locations that are user selectable for identifying a user's current location. For example, a listing of results may include a set of "check-in" locations, such as those provided by various location-aware mobile applications that enable a user to select and publish their current location for viewing by other users, such as friends on their social network. Notably, the acquisition of location information can be subject to user consent, and can, for example, be discarded after it is no longer needed. For example, the user may be provided with the option to share their location, and to control the accuracy and detail of what other can see.

Figure 21:
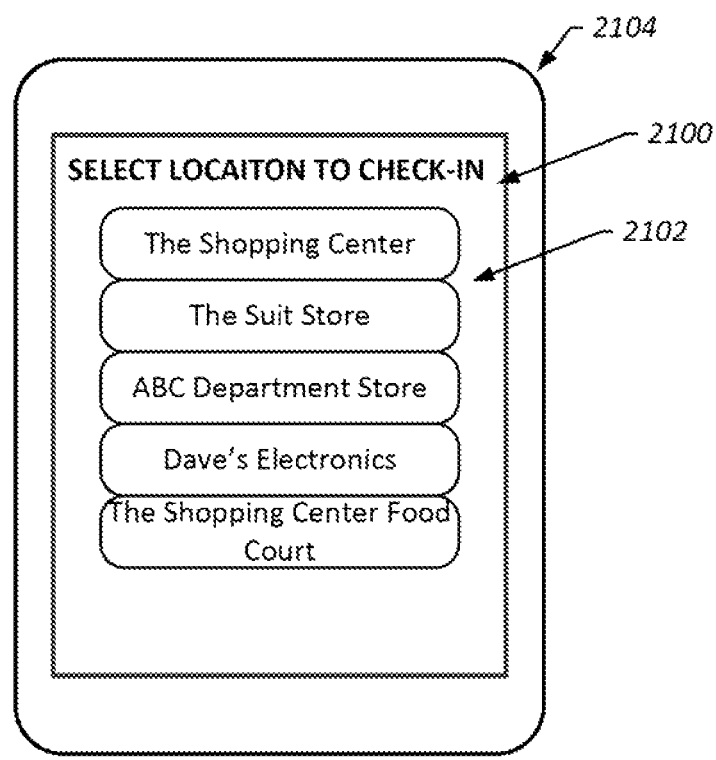
FIG. 21 depicts an exemplary check-in page including a hierarchically ordered listing of results displayed via an access device in accordance with one or more embodiments of the present technique.

FIG. 21 depicts an exemplary check-in page 2100 including a hierarchically ordered listing of results 2102 displayed via an access device 2104. Hierarchically ordered listing of results 2102 includes results corresponding to parent entities (e.g., "The Shopping Center") displayed above results corresponding to child entities (e.g., "The Suit Store", "ABC Department Store", "Dave's Electronics", "The Shopping Center Food Court"). For example, where a user is currently located in "The Suit Store", and request to check-in their current location, the raw listing of results may include "The Suit Store", "ABC Department Store", "The Shopping Center", "Dave's Electronics", and "The Shopping Center Food Court", in that order. Based on the hierarchical relationships between the entities, the results may be hierarchically reordered to "The Shopping Center", "The Suit Store", "ABC Department Store", "Dave's Electronics" and "The Shopping Center Food Court" such that the result corresponding to the parent entity "The Shopping Center" is displayed above the results corresponding to the child entities (see FIG. 21).

Methods 100, 300, 400, 500, 700, 800, 1300 and 1900 are exemplary embodiments of methods employed in accordance with techniques described herein. Methods 100, 300, 400, 500, 700, 800, 1300 and 1900 may be modified to facilitate variations of its implementations and uses. Methods 100, 300, 400, 500, 700, 800, 1300 and 1900 may be implemented in software, hardware, or a combination thereof. Some or all of methods 100, 300, 400, 500, 700, 800, 1300 and 1900 may be implemented by one or more of the modules described herein, such as query processing module 2212 depicted and described in more detail below with regard to FIG. 22. The order of methods 100, 300, 400, 500, 700, 800, 1300 and 1900 may be changed, and various elements may be added, reordered, combined, omitted, modified, etc.

Figure 22:
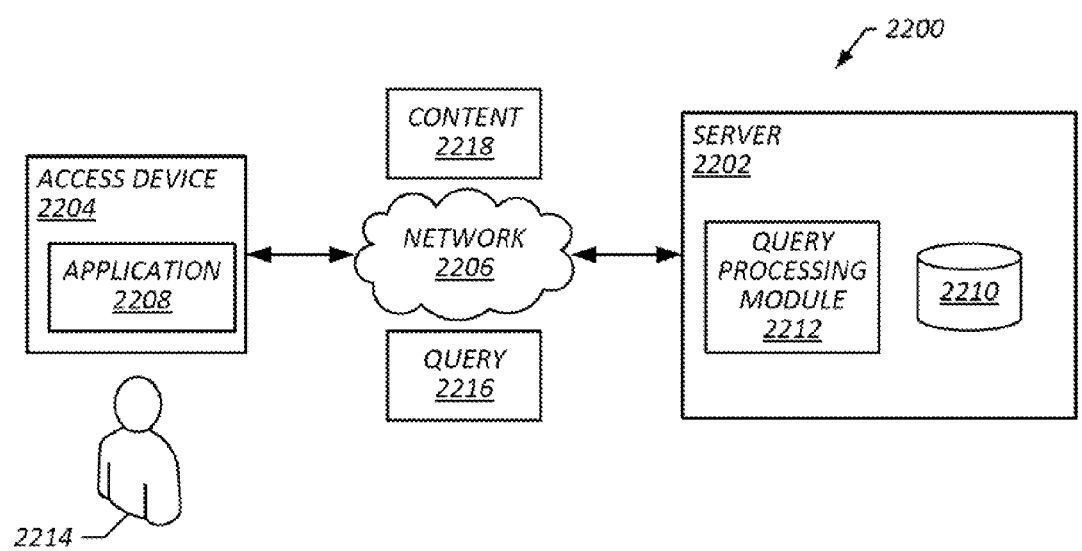
FIG. 22 is a diagram that illustrates a query system in accordance with one or more embodiments of the present technique.

FIG. 22 is a diagram that illustrates an exemplary query system 2200. In some embodiments, system 2200 includes a server 2202 and an access device 2204 communicatively coupled via a network 2206.

Network 2206 may include an electronic communications network, such as the Internet, a local area network (LAN), a wide area (WAN), a cellular communications network or the like. In some embodiments, network 2206 may include a single network or combination of networks.

Access device 2204 may include a device capable of communicating information via network 2206. For example, access device 2204 may include a personal computer (e.g., a desktop computer), a mobile computing device (e.g., a laptop or tablet computer), a cellular communication device (e.g., a cellular phone), a personal digital assistant (PDA), or the like. In some embodiments, access device 2204 may be client device of server 2202. In some embodiments, access device 2204 may include various input/output (I/O) interfaces, such as a graphical user interface (e.g., display screen), an audible output user interface (e.g., speaker), an audible input user interface (e.g., microphone), a keyboard, a pointer/selection device (e.g., mouse, trackball, touchpad, touchscreen, stylus or the like), a printer, or the like. In some embodiments, access device 2204 may include general computing components and/or embedded systems optimized with specific components for performing specific tasks. In some embodiments, access device 2204 may include a computer system similar to that of computer system 3000 described below with regard to at least FIG. 23.

In some embodiments, access device 2204 includes programs/applications 2208 that can be used to generate a request for content, to provide content, to render content, and/or to send/receive request to/from other devices via network 2206, such as client applications used for communicating with server 2202. For example, access device 2204 may include Internet browser application that facilitates communication with server 2202 and/or other entities of system 2000. In some embodiments, application 2208 may include modules having program instructions that are executable by a computer system to perform some or all of the functionality described herein with regard to access device 2204.

Server 2202 may include a network entity that serves requests by client entities, such as requests by access device 2204. Server 2202 may host a content site, such as a website, a file transfer protocol (FTP) site, an Internet search website or other source of network content. In some embodiments, server 2202 may include a search engine. In some embodiments, server 2202 includes, or otherwise has access to, a datastore 2210, such as a database or similar data repository. In some embodiments, server 2202 includes a query processing module 2212. Query processing module 2212 may include program instructions that are executable by a computer system to perform some or all of the functionality described herein with regard to server 2202. In some embodiments, server 2202 includes a computer system similar to that of computer system 3000 described below with regard to at least FIG. 23. Although server 2202 is represented by a single box in FIG. 22, server 2202 may include a single server or similar system, or a plurality of servers and/or similar systems. For example, server 2202 may include a plurality of different servers and/or similar systems that may be employed individually or in combination to perform some or all of the functionality described herein with regard to server 2202.

In some embodiments system 2200 is used to employ techniques described herein. For example, a user 2214 may submit a query 2216 (e.g., a search query, a request to navigate to content via selection of a map marker or a hyperlink to a place page, a request to check-in their location, or the like), server 2202 may process the query and serve content 2218 (e.g., a search results webpage, a bubble, a place page, or a listing of check-in locations, or the like) to access device 2204, and application 2208 may render content 2218 for display to user 2214.

Figure 23:
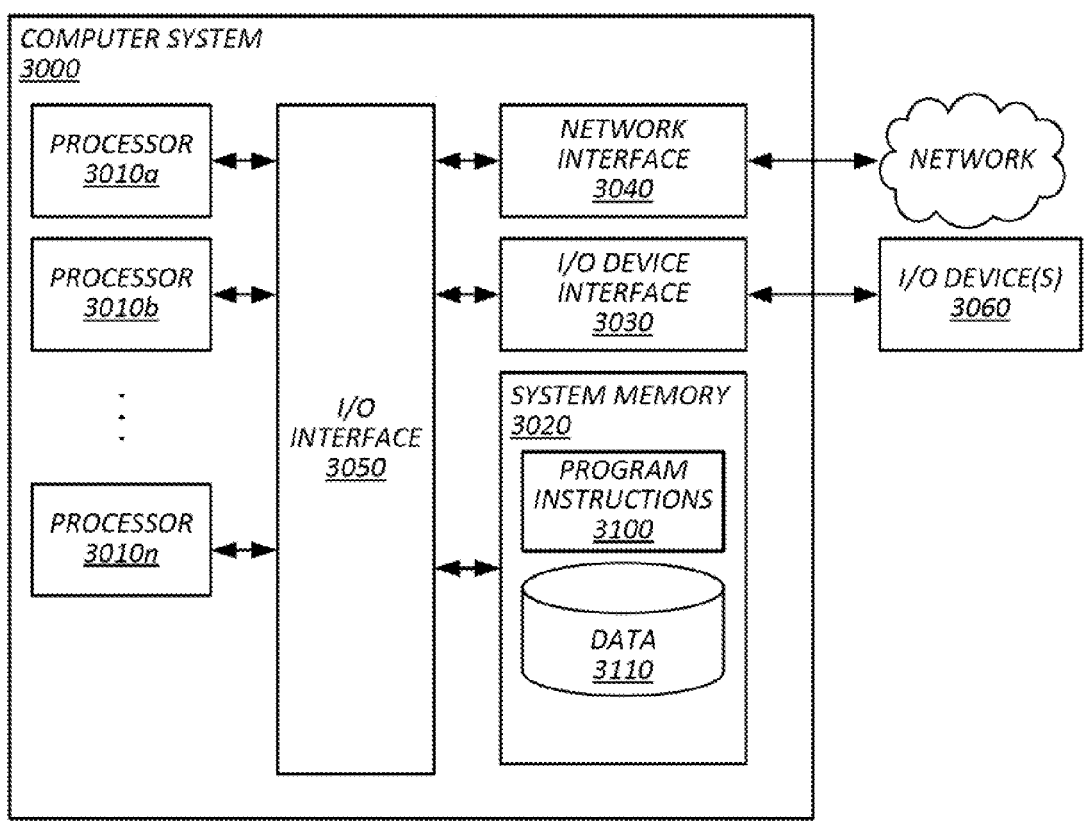
FIG. 23 is a diagram that illustrates an exemplary computer system in accordance with one or more embodiments of the present technique.

Exemplary Computer System:

FIG. 23 is a diagram that illustrates an exemplary computer system 3000. Various portions of systems and methods described herein, may include or be executed on one or more computer systems similar to system 3000. For example, server 2202 and/or access device 2204 may include a configuration similar to at least a portion of computer system 3000. Further, methods/processes/modules described herein (e.g., query processing module 2212 and/or application 2208) may be executed by one or more processing systems similar to that of computer system 3000.

Computer system 3000 may include one or more processors (e.g., processors 3010*a*-3010*n*) coupled to system memory 3020, an input/output I/O device interface 3030 and a network interface 3040 via an input/output (I/O) interface 3050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 3000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 3020). Computer system 3000 may be a uni-processor system including one processor (e.g., processor 3010*a*), or a multi-processor system including any number of suitable processors (e.g., 3010*a*-3010*n*). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 3000 may include a computer system employing a plurality of computer systems (e.g., distributed computer systems) to implement various processing functions.

I/O device interface 3030 may provide an interface for connection of one or more I/O devices 3060 to computer system 3000. I/O devices may include any device that provides for receiving input (e.g., from a user) and/or providing output (e.g., to a user). I/O devices 3060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 3060 may be connected to computer system 3000 through a wired or wireless connection. I/O devices 3060 may be connected to computer system 3000 from a remote location. I/O devices 3060 located on remote computer system, for example, may be connected to computer system 3000 via a network and network interface 3040.

Network interface 3040 may include a network adapter that provides for connection of computer system 3000 to a network. Network interface may 3040 may facilitate data exchange between computer system 3000 and other devices connected to the network. Network interface 3040 may support wired or wireless communication. The network may include an electronic communication network, such as the Internet, a local area network (LAN), a wide area network (WAN), a cellular communications network or the like.

System memory 3020 may be configured to store program instructions 3100 and/or data 3110. Program instructions 3100 may be executable by a processor (e.g., one or more of processors 3010*a*-3010*n*) to implement one or more embodiments of the present technique. Instructions 3100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 3020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof, or the like. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 3020 may include a non-transitory computer readable storage medium having program instructions stored thereon that are executable by a computer processor (e.g., one or more of processors 3010a-3010n) to cause the subject matter and the functional operations described herein. A memory (e.g., system memory 3020) may include a single memory device and/or a plurality of memory devices (e.g., distributed memory devices).

I/O interface 3050 may be configured to coordinate I/O traffic between processors 3010a-3010n, system memory 3020, network interface 3040, I/O devices 3060 and/or other peripheral devices. I/O interface 3050 may perform protocol, timing or other data transformations to convert data signals from one component (e.g., system memory 3020) into a format suitable for use by another component (e.g., processors 3010a-3010n). I/O interface 3050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 3000, or multiple computer systems 3000 configured to host different portions or instances of embodiments. Multiple computer systems 3000 may provide for parallel or sequential processing/execution of one or more portions of the techniques described herein.

Those skilled in the art will appreciate that computer system 3000 is merely illustrative and is not intended to limit the scope of the techniques described herein. Computer system 3000 may include any combination of devices and/or software that may perform or otherwise provide for the performance of the techniques described herein. For example, computer system 3000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 3000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
    identifying, by one or more processors, a candidate parent entity from an entity set, wherein the entity set comprises a plurality of entities, and wherein the candidate parent entity comprises an entity identified as having one or more characteristics indicative of the entity having a parent hierarchical relationship to another entity of the entity set;

identifying, by the one or more processors, a candidate child entity set from the entity set, wherein the candidate child entity set comprises entities of the entity set that are each identified as having one or more characteristics indicative of the entity having a child hierarchical relationship to the candidate parent entity; and for each entity of the candidate child entity set:
comparing, by the one or more processor, characteristics of the candidate parent entity to characteristics of the entity of the candidate child entity set to determine whether a hierarchical relationship exists between the candidate parent entity and the entity of the candidate child entity set; and in response to determining that a hierarchical relationship exists between the candidate parent entity and the entity of the candidate child entity set, updating, by the one or more processors, a hierarchical index to reflect the hierarchical relationship between the candidate parent entity and the entity of the candidate child entity set.

2. The method of claim 1, wherein identifying a candidate parent entity comprises identifying an entity of the entity set having a classification corresponding to a parent entity.

3. The method of claim 1, further comprising identifying a classification hierarchical relationship specifying a parent classification and a child classification, wherein identifying a candidate parent entity comprises identifying an entity of the entity set having a classification corresponding to the parent classification, and wherein identifying a candidate child entity set comprises identifying entities of the entity set having a classification corresponding to the child classification.

4. The method of claim 1, wherein identifying a candidate parent entity comprises identifying an entity of the entity set having a geometry corresponding to a parent entity.

5. The method of claim 1, wherein identifying a candidate parent entity comprises identifying an entity of the entity set having a polygon geometry.

6. The method of claim 1, wherein identifying a candidate parent entity comprises identifying an entity of the entity set having a descriptor including one or more keywords corresponding to a parent entity.

7. The method of claim 1, further comprising:
identifying a classification hierarchical relationship specifying a parent classification and a child classification;
identifying one or more keywords associated with the parent classification; and
identifying one or more keywords associated with the child classification,
wherein identifying a candidate parent entity comprises identifying an entity of the entity set having a descriptor comprising at least one of the one or more keywords associated with the parent classification, and wherein identifying a candidate child entity set comprises identifying entities of the entity set having a descriptor comprising at least one of the one or more keywords associated with the child classification.

8. The method of claim 7, wherein identifying one or more keywords associated with the parent classification comprises:
identifying a set of seed keywords associated with the parent classification;
identifying a seed entity set comprising entities having descriptors that comprise one or more of the seed keywords associated with the parent classification; and
assessing descriptors of the entities of the seed entity set to identify an expanded set of keywords, wherein the one or more keywords associated with the parent classification comprise the seed keywords and the expanded set of keywords.

9. The method of claim 7, wherein identifying one or more keywords associated with the child classification comprises:
identifying a set of seed keywords associated with the child classification;
identifying a seed entity set comprising entities having descriptors that comprise one or more of the seed keywords associated with the child classification; and
assessing descriptors of the entities of the seed entity set to identify an expanded set of keywords, wherein the one or more keywords associated with the child classification comprise the seed keywords and the expanded set of keywords.

10. The method of claim 1, wherein identifying a candidate child entity set comprises identifying entities of the entity set having an address that includes a descriptor of the candidate parent entity.

11. The method of claim 1, wherein identifying a candidate child entity set comprises identifying entities of the entity set having a location that is within a threshold distance of the candidate parent entity.

12. The method of claim 1, wherein identifying a candidate child entity set comprises identifying entities of the entity set having a location that is within a geographic area associated with the candidate parent entity.

13. The method of claim 1, wherein identifying a candidate child entity set comprises identifying entities of the entity set having a physical address that is the same or similar to the address of the candidate parent entity.

14. The method of claim 1, wherein comparing characteristics of the candidate parent entity to characteristics of the entity to determine whether a hierarchical relationship exists between the candidate parent entity and the entity of the candidate child entity set comprises:
scoring the candidate parent entity and the entity of the candidate child entity set via application of a plurality of scoring criteria to attributes of the candidate parent entity and attributes of the entity of the candidate child entity set, each of the scoring criteria associated with a score that is assigned to an entity that satisfies the scoring criteria;
determining a first score comprising a sum of scores assigned to the candidate parent entity;
determining a second score comprising a sum of scores assigned to the entity of the candidate child entity set;
determining that the first score is greater than the second score; and
in response to determining that the first score is greater than the second score, determining that the candidate parent entity is a parent of the entity of the candidate child entity set.

15. The method of claim 14, wherein the plurality of scoring criteria comprises at least one of the following:
an entity having an entity identifier that is contained in an address of the other entity such that, in response to determining that the candidate parent entity has an entity identifier that is contained in an address of the entity of the candidate child entity set, a score corresponding to the scoring criteria is assigned to the candidate parent entity or, in response to determining that the entity of the candidate child entity set has an entity identifier that is contained in an address of the candidate parent entity, the score corresponding to the scoring criteria is assigned to the entity of the candidate child entity set;

an entity having an entity identifier that is contained in an entity identifier of the other entity such that, in response to determining that the candidate parent entity has an entity identifier that is contained in an entity identifier of the entity of the candidate child entity set, a score corresponding to the scoring criteria is assigned to the candidate parent entity or, in response to determining that the entity of the candidate child entity set has an entity identifier that is contained in an entity identifier of the candidate parent entity, the score corresponding to the scoring criteria is assigned to the entity of the candidate child entity set;

an entity associated with the highest number of impressions such that, in response to determining that the candidate parent entity is associated with a greater number of impressions than the entity of the candidate child entity set is associated with, a score corresponding to the scoring criteria is assigned to the candidate parent entity or, in response to determining that the entity of the candidate child entity set is associated with a greater number of impressions than the candidate parent entity is associated with, a score corresponding to the scoring criteria is assigned to the entity of the candidate child entity set; and an entity comprising an entity identifier comprising keywords associated with a parent entity such that, in response to determining that the candidate parent entity has an entity identifier comprising a keyword associated with a parent entity, a score corresponding to the scoring criteria is assigned to the candidate parent entity or, in response to determining that the entity of the candidate child entity set has an entity identifier comprising a keyword associated with a parent entity, a score corresponding to the scoring criteria is assigned to the entity of the candidate child entity set.

16. The method of claim 1 further comprising:
receiving a search query;
processing the search query to identify a set of search results;
comparing the set of search results to the hierarchical index to determine whether the set of search results comprises a parent search result corresponding to a parent entity;
determining that the set of search results comprises a parent search result corresponding to a parent entity;
in response to determining that the set of search results comprises a parent search result corresponding to a parent entity, identifying a set of child search results comprising one or more child search results that correspond to one or more entities that are children of the parent entity; and
providing a hierarchical search results list for display, the hierarchical search results list comprising:
a first listing of search results corresponding to the set of search results; and
a second listing of search results corresponding to the set of child search results, the second listing configured to be displayed in hierarchical relation to a displayed search result corresponding to the parent search result of the set of search results.

17. The method of claim 1, wherein the entity set comprises entities corresponding to an indexed listing of entities generated based on crawling of Internet websites.

18. The method of claim 1, wherein the entity set comprises entities corresponding to places having a geographic location associated therewith.

19. A non-transitory computer readable storage medium having computer-executable program instructions stored thereon that are executable by a computer to cause the following:
identifying a candidate parent entity from an entity set, wherein the entity set comprises a plurality of entities, and wherein the candidate parent entity comprises an entity having one or more characteristics indicative of the entity having a parent hierarchical relationship to another entity of the entity set;
identifying a candidate child entity set from the entity set, wherein the candidate child entity set comprises entities of the entity set that are each identified as having one or more characteristics indicative of the entity having a child hierarchical relationship to the candidate parent entity; and
for each entity of the candidate child entity set:
comparing characteristics of the candidate parent entity to characteristics of the entity of the candidate child entity set to determine whether a hierarchical relationship exists between the candidate parent entity and the entity of the candidate child entity set; and
in response to determining that a hierarchical relationship exists between the candidate parent entity and the entity of the candidate child entity set, updating a hierarchical index to reflect the hierarchical relationship between the candidate parent entity and the entity of the candidate child entity set.

20. A system comprising:
one or more memories storing instructions; and
one or more processors coupled to the one or more memories and executing the instructions stored thereon in order to perform the following steps:
identifying a candidate parent entity from an entity set, wherein the entity set comprises a plurality of entities, and wherein the candidate parent entity comprises an entity having one or more characteristics indicative of the entity having a parent hierarchical relationship to another entity of the entity set;
identifying a candidate child entity set from the entity set, the candidate child entity set comprises entities of the entity set that are identified as having one or more characteristics indicative of the entity having a child hierarchical relationship to the candidate parent entity; and
for each entity of the candidate child entity set:
comparing characteristics of the candidate parent entity to characteristics of the entity of the candidate child entity set to determine whether a hierarchical relationship exists between the candidate parent entity and the entity of the candidate child entity set; and
in response to determining that a hierarchical relationship exists between the candidate parent entity and the entity of the candidate child entity set, updating a hierarchical index to reflect the hierarchical relationship between the candidate parent entity and the entity of the candidate child entity set.

* * * * *